(12) United States Patent
Batcher et al.

(10) Patent No.: US 12,393,180 B2
(45) Date of Patent: Aug. 19, 2025

(54) BLOCKCHAIN-ENABLED DIGITAL TWINS FOR INDUSTRIAL AUTOMATION SYSTEMS

(71) Applicant: Rockwell Automation Technologies, Inc., Mayfield Heights, OH (US)

(72) Inventors: Kenneth W. Batcher, Hudson, OH (US); Sharath Chander Reddy Baddam, Twinsburg, OH (US); Juergen K. Weinhofer, Chagrin, OH (US); Timothy S. Biernat, Franklin, WI (US); David A. Vasko, Hartland, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 478 days.

(21) Appl. No.: 17/934,463

(22) Filed: Sep. 22, 2022

(65) Prior Publication Data

US 2024/0103504 A1 Mar. 28, 2024

(51) Int. Cl.
G05B 19/418 (2006.01)

(52) U.S. Cl.
CPC ............ *G05B 19/41885* (2013.01); *G05B 2219/31229* (2013.01)

(58) Field of Classification Search
CPC .............. G05B 19/41885; G05B 2219/31229
See application file for complete search history.

(56) References Cited

U.S. PATENT DOCUMENTS

| | | |
|---|---|---|
| 2016/0328883 A1 | 11/2016 | Parfenov et al. |
| 2019/0222418 A1 | 7/2019 | O'Brien et al. |
| 2019/0228174 A1 | 7/2019 | Withrow et al. |
| 2019/0340269 A1* | 11/2019 | Biernat ............... H04L 63/12 |
| 2019/0354922 A1 | 11/2019 | Berti et al. |

(Continued)

OTHER PUBLICATIONS

Final Office Action received for U.S. Appl. No. 17/934,472, dated Mar. 15, 2024, 42 pages.

(Continued)

*Primary Examiner* — Christopher E. Everett
(74) *Attorney, Agent, or Firm* — Amin, Turocy & Watson, LLP

(57) ABSTRACT

Blockchain-enabled digital twins for industrial automation systems (e.g., using a computerized tool) are enabled. For example, a non-transitory computer-readable medium having stored thereon instructions that, in response to execution, cause an industrial device comprising a processor to perform operations, the operations comprising: determining an equivalency of the configuration of the industrial automation component based on a comparison of the first configuration fingerprint with a second configuration fingerprint of the configuration of the industrial automation component generated at a second time, subsequent to the first time, determining an equivalency of the configuration of the industrial automation component based on a comparison of the first configuration fingerprint with a second configuration fingerprint of the configuration of the industrial automation component generated at the second time, and generating an output indicative of the equivalency of the digital twin and the equivalency of the configuration.

20 Claims, 21 Drawing Sheets

(56) References Cited

U.S. PATENT DOCUMENTS

| | | | |
|---|---|---|---|
| 2019/0384587 A1* | 12/2019 | Rao | G06F 21/572 |
| 2020/0059510 A1* | 2/2020 | Russom | H04L 47/70 |
| 2020/0274768 A1 | 8/2020 | Böhm | |
| 2020/0295942 A1 | 9/2020 | Bartolucci et al. | |
| 2021/0058460 A1 | 2/2021 | Schlichtner | |
| 2021/0081938 A1 | 3/2021 | Falk | |
| 2021/0110004 A1 | 4/2021 | Ross et al. | |
| 2021/0157561 A1* | 5/2021 | Gilton | B64D 45/00 |
| 2021/0158242 A1* | 5/2021 | Berti | G06Q 10/06311 |
| 2021/0208576 A1* | 7/2021 | Muenzel | G05B 19/41885 |
| 2021/0294946 A1* | 9/2021 | Hendriks | G16H 50/20 |
| 2022/0147008 A1 | 5/2022 | Cooley et al. | |
| 2022/0191648 A1 | 6/2022 | Smith et al. | |
| 2022/0270190 A1 | 8/2022 | Elgethun | |
| 2022/0414621 A1 | 12/2022 | Parlotto et al. | |

OTHER PUBLICATIONS

U.S. Appl. No. 17/934,472, filed Sep. 22, 2022, 72 pages.
Batcher et al., "Blockchain-enabled Digital Twins for Industrial Automation Systems", U.S. Appl. No. 17/934,463, filed Sep. 22, 2022, 74 pages.
Non Final Office Action received for U.S. Appl. No. 17/934,472, dated Nov. 29, 2023, 41 pages.

* cited by examiner

BLOCKCHAIN-ENABLED DIGITAL TWINS FOR INDUSTRIAL AUTOMATION SYSTEMS

BACKGROUND

The subject matter disclosed herein relates generally to industrial automation systems and, more particularly, blockchain-enabled digital twins for industrial automation systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

According to an embodiment, a system can comprise: a memory that stores executable components, and a processor, operatively coupled to the memory, that executes the executable components, the executable components comprising: a generation component that generates, at a first time, a first digital twin fingerprint for a digital twin of an industrial automation system and a first configuration fingerprint representative of a configuration of the industrial automation system, a blockchain component that stores the first digital twin fingerprint and the first configuration fingerprint to an immutable blockchain ledger, and a comparison component that: determines an equivalency of the digital twin based on a comparison of the first digital twin fingerprint with a second digital twin fingerprint applicable to the industrial automation system generated at a second time, subsequent to the first time, or determines an equivalency of the configuration of the industrial automation system based on a comparison of the first configuration fingerprint with a second configuration fingerprint of the configuration of the industrial automation system generated at the second time, and generates an output indicative of the equivalency of the digital twin or the equivalency of the configuration.

In another embodiment, a method can comprise: generating, by an industrial device comprising a processor, at a first time, at a first time, a first digital twin fingerprint for a digital twin of an industrial automation system and a first configuration fingerprint representative of a configuration of the industrial automation system, storing, by the industrial device, the first digital twin fingerprint and the first configuration fingerprint to an immutable blockchain ledger, determining, by the industrial device, an equivalency of the digital twin based on a comparison of the first digital twin fingerprint with a second digital twin fingerprint applicable to the industrial automation system generated at a second time, subsequent to the first time, determining, by the industrial device, an equivalency of the configuration of the industrial automation system based on a comparison of the first configuration fingerprint with a second configuration fingerprint of the configuration of the industrial automation system generated at the second time, and generating, by the industrial device, an output indicative of the equivalency of the digital twin and the equivalency of the configuration.

In yet another embodiment, a non-transitory computer-readable medium can have stored thereon instructions that, in response to execution, cause an industrial device comprising a processor to perform operations, the operations comprising: generating, at a first time, at a first time, a first digital twin fingerprint for a digital twin of an industrial automation component and a first configuration fingerprint representative of a configuration of the industrial automation component, storing the first digital twin fingerprint and the first configuration fingerprint to an immutable blockchain ledger, determining an equivalency of the configuration of the industrial automation component based on a comparison of the first configuration fingerprint with a second configuration fingerprint of the configuration of the industrial automation component generated at a second time, subsequent to the first time, determining an equivalency of the configuration of the industrial automation component based on a comparison of the first configuration fingerprint with a second configuration fingerprint of the configuration of the industrial automation component generated at the second time, and generating an output indicative of the equivalency of the digital twin and the equivalency of the configuration.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
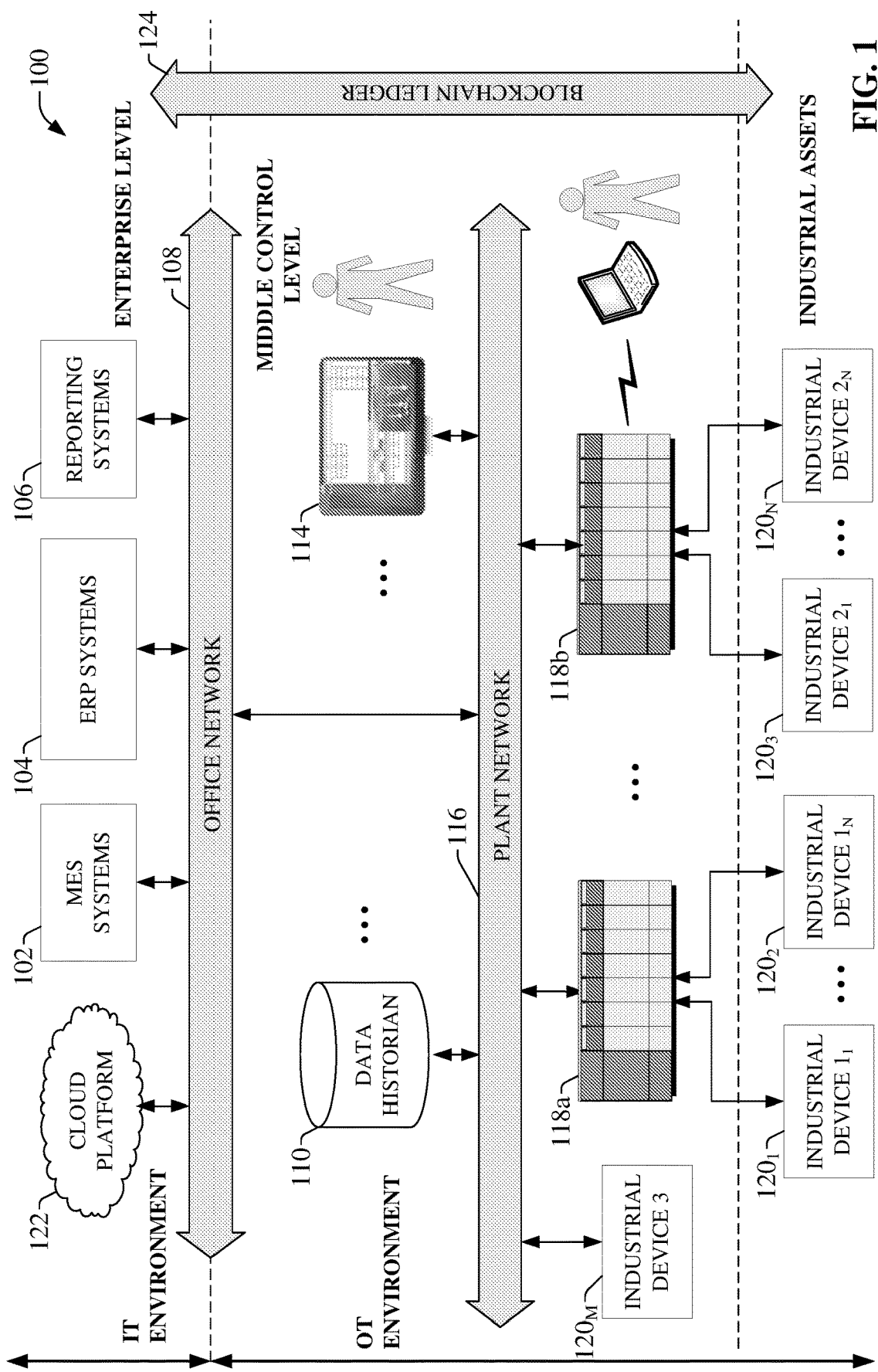
FIG. 1 is a block diagram of an example industrial control environment in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that can comprise a number of devices, components, modules, and the like. It is to be understood and appreciated that the various systems can comprise additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 can be deployed throughout an industrial plant environment (e.g., to monitor and control respective industrial systems or processes relating to product manufacture, machining, motion control, batch processing, material handling, or other suitable industrial functions). In various embodiments, industrial controllers 118 can execute respective control programs to facilitate monitoring and control of industrial devices 120 making up the controlled industrial assets or systems (e.g., industrial machines). One or more industrial controllers 118 can additionally or alternatively comprise a soft controller (e.g., executed on a personal computer, on a server blade, or other hardware platform, or on a cloud platform). Some hybrid devices can additionally or alternatively combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, JavaScript, etc.

In one or more embodiments, industrial devices 120 can comprise input devices that provide data relating to the controlled industrial systems to the industrial controllers 118, output devices that respond to control signals generated by the industrial controllers 118 to control aspects of the industrial systems, and/or devices that act as both input and output devices. Exemplary input devices can comprise telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and/or other suitable telemetry devices. Output devices can comprise motor drives, pneumatic actuators, signaling devices, robot control inputs, valves, and/or other suitable output devices. Some industrial devices, such as industrial device 120M, can operate autonomously on the plant network 116 (e.g., without being controlled by an industrial controller 118).

In various implementations, industrial controllers 118 can communicatively interface with industrial devices 120 over hardwired connections or over wired or wireless networks. For example, industrial controllers 118 can be equipped with native hardwired inputs and outputs (e.g., that communicate with the industrial devices 120 to effect control of the devices). The native controller I/O can comprise digital I/O that transmits and receives discrete voltage signals to and from the field devices and/or analog I/O that transmits and receives analog voltage or current signals to and from the devices. The controller I/O can communicate with a controller's processor over a backplane (e.g., such that the digital and analog signals can be read into and controlled by the control programs). It is noted that the industrial controllers 118 can comprise compute modules and/or coprocessors, which can interface with a backplane, wireless network, and/or wired network. Such compute modules can access controller data and/or run suitable operating systems. Such compute modules can further comprise separate network interfaces, which can bridge to a secure server over a cloud network, which can be utilized authenticate blockchains herein. Industrial controllers 118 can additionally or alternatively communicate with industrial devices 120 over the plant network 116 using, for instance, a communication module or an integrated networking port. Exemplary networks can comprise the Internet, intranets, Ethernet, EtherNet/IP, DeviceNet, ControlNet, Data Highway and Data Highway Plus (DH/DH+), Remote I/O, Fieldbus, Modbus, Profibus, wireless networks (including, but not limited to, cellular networks such as fourth generation networks, fifth generation networks, sixth generation networks, etc.), serial protocols, and the like. The industrial controllers 118 can additionally or alternatively store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices (e.g., including but not limited to motor drives, instruments, or condition monitoring modules) can store data values that are used for control and/or to visualize states of operation. Such devices can additionally or alternatively capture time-series data or events on a log for later retrieval and viewing.

Industrial automation systems herein can comprise one or more human-machine interfaces (HMIs) 114 that can enable plant personnel to view telemetry and status data associated with the automation systems and/or to control some aspects of system operation. HMIs 114 can communicate with one or more of the industrial controllers 118 over a plant network 116, and/or exchange data with the industrial controllers to facilitate visualization of information relating to the controlled industrial processes on one or more pre-developed operator interface screens. HMIs 114 can additionally or alternatively be configured to enable operators to submit data to specified data tags or memory addresses of the industrial controllers 118, thereby providing a means for operators to issue commands to the controlled systems (e.g., cycle start commands, device actuation commands, etc.) to modify setpoint values, etc. HMIs 114 can generate one or more display screens through which the operator interacts with the industrial controllers 118, and thereby with the controlled processes and/or systems. Exemplary display screens of one or more embodiments herein can visualize present states of industrial systems or their associated devices using graphical representations of the processes that display metered or calculated values, employ color or position animations based on state, render alarm notifications, and/or employ other such techniques for presenting relevant data to the operator. Data presented in this manner can be read from industrial controllers 118 by HMIs 114 and presented on one or more of the display screens according to display formats chosen by the HMI developer. HMIs can comprise fixed location or mobile devices with either user-installed or pre-installed operating systems, and either user-installed or pre-installed graphical application software.

Some industrial environments can additionally or alternatively comprise other suitable systems or devices relating to specific aspects of the controlled industrial systems. For example, one or more data historians 110 can aggregate and/or store production information collected from the industrial controllers 118 and other industrial devices.

Industrial devices 120, industrial controllers 118, HMIs 114, associated controlled industrial assets, and/or other plant-floor systems such as data historians 110, vision systems, and/or other suitable systems can operate on the operational technology (OT) level of the industrial environment. Higher level analytic and reporting systems can operate at the higher enterprise level of the industrial environment in the information technology (IT) domain (e.g., on an office network 108 or on a cloud platform 122). Such higher-level systems can comprise, for instance, enterprise resource planning (ERP) systems 104 that can integrate and/or collectively manage high-level business operations, such as finance, sales, order management, marketing, human resources, and/or other such business functions. Manufacturing Execution Systems (MES) 102 can monitor and manage control operations on the control level given higher-level business considerations. Reporting systems 106 can collect operational data from industrial devices on the plant floor and generate daily and/or shift reports that summarize operational statistics of the controlled industrial assets.

One or more components, devices, systems, etc. of the industrial environment 100 can be configured to utilize or interface with the blockchain ledger 124 (e.g., an immutable blockchain ledger). In various embodiments, the blockchain ledger 124 can be utilized in conjunction with digital twins (e.g., digital twins respectively associated with the industrial controllers 118 or other components, devices, systems, etc. of the industrial environment 100, as later discussed herein), configurations, and fingerprints digital twins and device configurations. In various embodiments, such fingerprints can be generated using a defined hash or checksum algorithm. In this regard, fingerprint(s) can be generated as a function of hardware devices and/or software components that make up an automation system, device, controller, etc. As described herein, a digital twin comprises a mathematical representation or model of the functionality of a physical system (e.g., an industrial automation device, controller, etc.) that can be simulated to produce one or more simulated metrics for a given physical system. In this regard, a digital twin may be accurate only with a particular set of equipment that makes up a physical system, but is not necessarily recorded in the digital twin (e.g., the specifics of the hardware and software that make up the physical system are not necessarily inherent to the digital twin). Thus, a fingerprint of a digital twin can comprise a hash of the digital twin that can be utilized to simulate a physical system.

As described herein, a configuration can comprise a specific hardware and/or software makeup of a physical system, and a digital twin herein may be accurate only with certain subsets of configurations applicable to the digital twin. The configuration is the representation of the exact hardware devices that make up a system, software configuration, configuration parameters, software aspects that comprise an itemization of a physical system that can be simulated. Thus, a fingerprint of a configuration can comprise a hash of the specific hardware and/or software makeup of a physical system. It is noted that a given digital twin can be compatible with a plurality of configurations, or only a single configuration. In this regard, a validation sequence herein can comprise a determination of whether a digital twin is still valid for simulation of a physical system herein by determining whether a fingerprint of a digital twin is applicable to one or more of a set of defined configuration fingerprints associated with the given digital twin.

In an example, to simulate a product throughput of a physical machine at various operating modes or speeds, the digital twin can comprise a mathematical model that describes the mathematical relationships between a performance indicator (e.g., product output) and other inputs to the system (e.g., speed, pressure, etc.). In this regard, the digital twin considers physical rules to simulate output given different machine states and different operating modes. The digital twin abstracts the specific hardware and software that is used to make up the physical system and is not hardware-specific or software-specific to the physical system. Because a digital twin is only designed to work with a specific collection of equipment, there exists a need to verify that a physical system is still represented in that collection of equipment, else a compatibility issue can arise between the digital twin and the physical system. One or more embodiments herein can generate a flag or alert if a change is made to a digital twin without a change made to a corresponding physical system, or if a change it made to a digital configuration without a change being made to a corresponding physical system configuration, or vice-versa.

As electronic devices, such as industrial automation devices or systems, become increasingly complex and capable, failure events (e.g., from accidental or malicious activities) can force an entire manufacturing operation to shut down. Further, maintenance or modifications to industrial automation device (e.g., authorized, or grey market) can be difficult to track, leading to potential system failures and/or potential proliferation of unauthorized devices in secondary markets.

To address these and other issues, a variety of industrial devices can be configured to support implementation of a digital twin and a digital representation of a physical configuration. Such a digital twin can be utilized in conjunction with a digital configuration to simulate a living replica of an industrial automation component, device, group of devices (e.g., a configuration in a factory), etc. and can enable the prediction of failure events, prediction for a need for device replacement, or detection of viruses or other malicious software, among other applications (e.g., based on a comparison of a digital twin and/or respective fingerprints to corresponding hardware or software and/or to other digital twins or other fingerprints of the corresponding hardware or software).

In one or more embodiments, blockchain-capable industrial devices, controllers, or other systems herein can generate a digital twin of an automation system and a fingerprint of the digital twin, and store the fingerprint and/or digital twin itself on a blockchain ledger. The blockchain-capable industrial devices, controllers, or other systems herein can compare respective digital twins or configurations against physical counterparts to compare actual physical or software implementation, including the ordering of slots, modules, wires, etc. in an industrial device, or to compare simulated outputs. For example, if a program is downloaded to a PLC, the program can be matched to a digital configuration of that program in order to validate the download and/or installation of the program. Further, if a program is downloaded to a PLC, a fingerprint of a configuration comprising the program can be matched to other configuration fingerprints (e.g., defined or known valid fingerprints) in order to validate the download and/or installation of the program. A similar comparison can occur in connection with maintenance and/or service contracts to ensure a lack of modifications or grey market component installations. In some embodiments, such a comparison can be executed using artificial intelligence. Further, changes in in a device, software, or factory configuration can be recognized using such artificial intelligence (e.g., using machine learning) and mapped to the digital twin, configuration, and/or respective fingerprint(s). Implementation of the digital twin and corresponding fingerprint(s) with an industrial blockchain can increase confidence in the accuracy and equivalency of the digital twin, the configuration, and their real-world counterparts. In some embodiments, digital twins herein can be associated with a plurality of configurations of a respective industrial automation device.

In order to determine an equivalence of a digital twin of a physical system and/or a configuration of a physical system (e.g., from different points in time, different versions, different revisions, etc.), a PLC or another industrial automation device can query a fingerprint of a digital twin and/or a fingerprint of a configuration to verify that either, or both, match their physical system counterparts, for instance, by generating comparing fingerprints from a first point in time to fingerprints from a second point in time (e.g., a current time). To this end, the blockchain-enabled PLC or industrial device can write current system configuration fingerprint and/or a digital twin fingerprint to the blockchain ledger. Example configuration information that can be recorded in configuration fingerprints can include, but is not limited to, the identities of the industrial devices that make up the automation system (e.g., controllers and their associated control modules, motor drives, safety relays, safety input devices, telemetry devices, sensors, vision systems, etc.), software versions or firmware versions installed on the devices, configuration parameter settings for the devices, network settings, security settings, or other such configuration information. The fingerprinting algorithm used to generate fingerprints herein can generate, as the fingerprint, a unique identifier that is a function of one or more items of configuration information or digital twin information. The blockchain-enabled industrial devices can be configured to provide updates to the blockchain on which a fingerprint is stored so that entries to the blockchain ledger match each change to the real-world device or software (e.g., as the device, software, or factory configuration changes). In some embodiments, the blockchain-enabled industrial device can store a fingerprint of a complete configuration of a full automation system and/or fingerprints of a complete digital twin onto a blockchain. In other embodiments, a digital twin fingerprint and/or configuration fingerprint can be split into transactions representing changes to the physical automation system, and every change to a system can be added to the blockchain as a transaction when the change is detected, without updating the entire configuration at each change. Hashing of software and/or checksums can be utilized, by a PLC or another industrial automation device, in generation of fingerprints and/or comparisons of the digital twin, the configuration (e.g., digital representation of the configuration), and the real-world, physical device. The blockchain ledger can be individualized for each respective software or hardware device, or can be an aggregate of a plurality of software or hardware devices that make up an automation system, collection of automation systems, or plant facility. In various embodiments, outputs or representations of a digital twin or configuration can be vectorized, by a system herein, PLC, or another industrial automation device, in order to compare a vector set with a real-world vector set and assess whether or not a change or modification has occurred.

In some embodiments, the industrial blockchain can be utilized by a system herein, PLC, or another industrial automation device, to propagate updates to an industrial device to other similar devices elsewhere. For example, an update of a device in a first factory or facility, determined to be successful, by a system herein, PLC, or another industrial automation device, can be recorded to an industrial blockchain (e.g., via a corresponding fingerprint) for subsequent application in additional factories to ensure accurate and consistent configurations across the industrial enterprise.

In some embodiments, the real-world device (e.g., a PLC, a motor drive, or another such industrial device) can write to the blockchain or to a cloud storage. In other embodiments, the digital twin can write (e.g., record fingerprints) to the blockchain. In additional embodiments, both the digital twin and real-world device can write to the blockchain. One or more of the foregoing can enable simulation and/or data generation using the digital twin (e.g., stored in a cloud storage and/or on a blockchain herein) and/or the real-world device, for instance, in order to compare data generated from both the digital twin and the real-world device. Data in such a simulation can be obtained from common data sources through oracles (e.g., blockchain oracles) that operate as conduits to real data sources. Any deviation in such a comparison can be indicative of an inequivalence between the device and its digital twin (and a likely problem with the device). The foregoing can be utilized, by a system herein, PLC, or another industrial automation device, in order to execute comparison tests between the digital twin/configuration and the corresponding real-world device before allowing the device to perform control functions. For example, in the case of an industrial controller, such as a PLC, the controller's ability to generate control outputs or control machinery can be contingent on verification that the controller's programming and configuration match that recorded in the digital twin/configuration and/or corresponding fingerprints. In some embodiments, a controller or system herein can utilize a physics-based simulation which can be used to determine how the real-world has deviated from the blockchain-based digital twin.

It is noted that the digital twin and/or configuration can be stored in a cloud storage and/or on a blockchain herein. In some embodiments, the digital twin and configuration can be utilized, by a system herein, PLC, or another industrial automation device, in the determination of device wear-out and other prognostics. For example, a given device can be capable of operating for 10 years at a defined temperature; however, such operating capability may be reduced if the device is operated at increased temperatures. In an embodiment, an industrial device (e.g., a PLC, a motor drive, or other such device) can utilize a temperature sensor that periodically reads the device's operating temperature and determine whether the measured temperature exceeds a defined temperature limit of the device (and its digital twin.) In some embodiments, this analysis may involve subjecting the digital twin and configuration to a physics-based simulation in order to predict future device failure based on a comparison between predicted future device operation and ideal operating conditions stored to the blockchain, or to a cloud server or another suitable storage, by the real-world device. Such operating conditions can comprise temperature fluctuations, electrical surges, operating speeds, or other such conditions. By tracking (e.g., by a system herein, PLC, or another industrial automation device), device-wear out via the digital twin, dynamic warranties, or service contracts can be enabled. In this regard, historical status or operational data from a device (e.g., a PLC) can be stored on a blockchain, or a cloud server or another suitable storage, and utilized to determine whether the device has been operated outside of warranty requirements (e.g., operating within a defined threshold temperature, speed, or frequency).

Some system or device vendors, such as original equipment manufacturers (OEMs), design and build devices (e.g., PLC devices, I/O modules, adapters, motors, motor drives such as variable frequency drives, etc.) or complete automation systems or subsystems to order. To ensure that these custom devices or systems remain within design specifications after sale and deployment to end customers, a reference design can be generated for the custom device or system, and a defined quantity of copies of the custom device or system can be produced. Reference design fingerprints can be stored to a blockchain as fingerprints of a reference digital twin and/or reference configuration, and compared against the real-world devices or systems (e.g., via respective fingerprints) to ensure that the device or system matches the reference design. Design aspects that can be verified in this manner can include, but are not limited to, the control program executing on an industrial controller, I/O configurations, network configurations, hardware settings such as dual in-line package (DIP) switch settings, or other such design aspects. In other embodiments, fingerprints of a digital twin and configuration can be generated for each device or automation system, and the fingerprints can be compared to one another and/or a reference design fingerprint. These comparisons can be conducted during the production process so that rollbacks to defined design snapshots can be initiated if a mismatch between the reference design and the physical configuration is detected.

Figure 2:
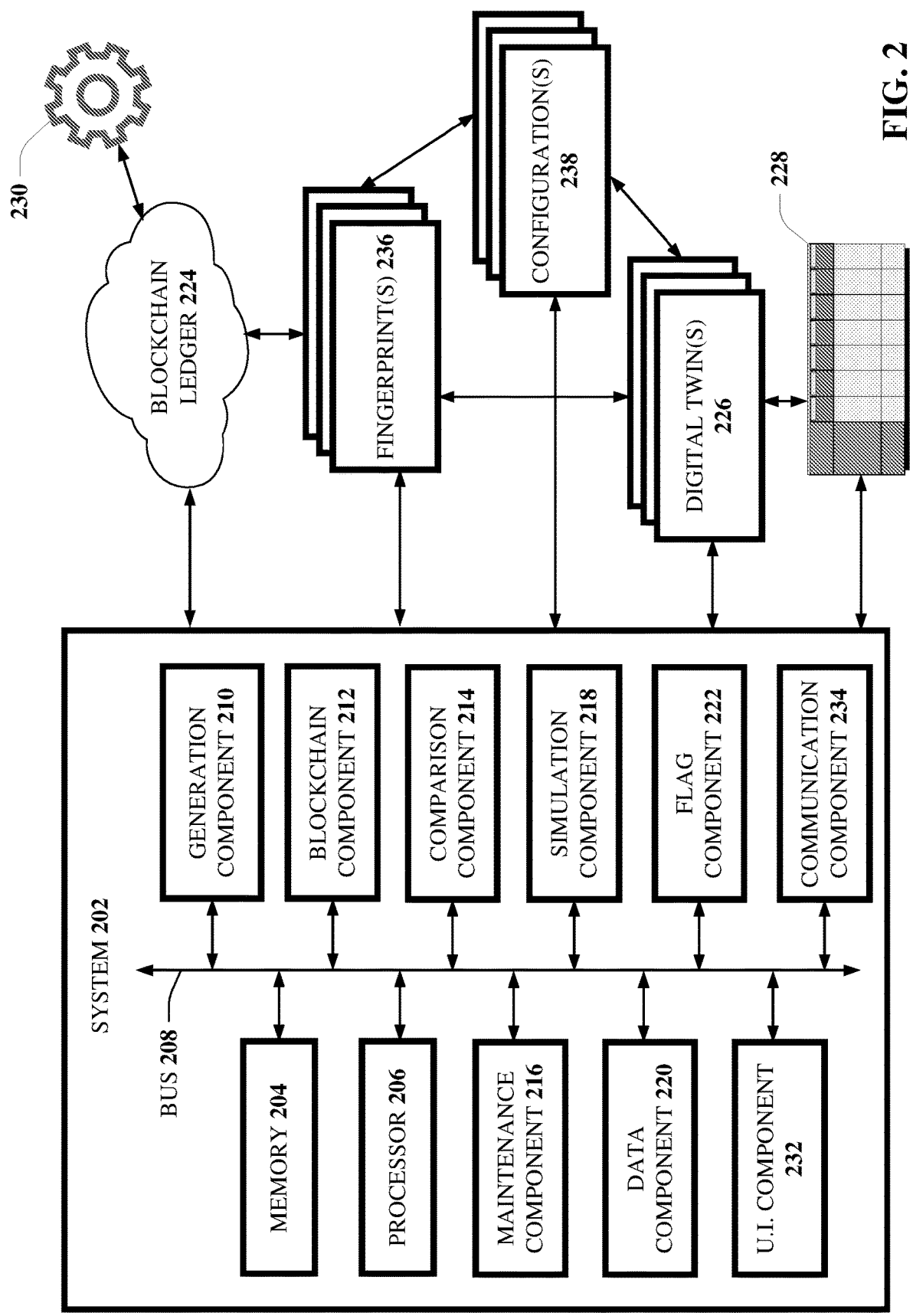
FIG. 2 is a block diagram of an exemplary system in accordance with one or more embodiments described herein.

FIG. 2 illustrates an example, non-limiting system 202 in accordance with one or more embodiments herein. System 202 can comprise a computerized tool, which can be configured to perform various operations relating to blockchain-enabled digital twins for industrial automation systems. The system 202 can comprise one or more of a variety of components, such as memory 204, processor 206, bus 208 (e.g., similar to system bus 2008), generation component 210, blockchain component 212, comparison component 214, maintenance component 216, simulation component 218, data component 220, flag component 222, user interface (U.I.) component 232, and/or communication component 234. In various embodiments, the system 202 can be communicatively coupled to, or can further comprise, blockchain ledger 224 (e.g., similar to the blockchain ledger 124), digital twin(s) 226, industrial automation device 228, blockchain oracle 230, fingerprint(s) 236, and/or configuration(s) 238. In various embodiments, one or more of the memory 204, processor 206, bus 208, generation component 210, blockchain component 212, comparison component 214, maintenance component 216, simulation component 218, data component 220, flag component 222, user interface (U.I.) component 232, communication component 234, blockchain ledger 224, digital twin(s) 226, industrial automation device 228, blockchain oracle 230, fingerprint(s) 236, and/or configuration(s) 238 can be communicatively or operably coupled (e.g., over a bus or wireless network) to one another to perform one or more functions of the system 202.

According to an embodiment, the generation component 210 can generate a digital twin (e.g., digital twin 226) of an industrial automation device 228—such as a PLC, a motor drive, a telemetry device, or other such device—or an automation system made up of multiple industrial automation devices 228. The generation component 210 can also generate a digital representation of a configuration of the industrial device 228 or automation system (e.g., configuration 238). The digital twin 226 can comprise a mathematical representation or model of the functionality of the industrial device 228, which can be simulated to produce one or more simulated metrics for the industrial device 228. The configuration 238 can comprise a digital replica or digitized version of the industrial automation device 228 (e.g., an industrial automation component) or automation system, which can comprise a specific hardware and/or software makeup of a physical system. In general, the digital twin 226 may be designed to mathematically simulate one or more operational aspects or performance metrics of an industrial automation device 228 or system having the hardware and software configuration represented by the configuration 238. The generation component 210 can further generate (e.g., at a first time) a first digital twin fingerprint (e.g., of the fingerprints 236) of the digital twin 226 and a first configuration fingerprint (e.g., of the fingerprints 236) representative of a physical configuration the industrial automation device 228. The digital twin fingerprints described herein can comprise unique identifiers of respective digital twins, devices, controllers, and/or equipment herein. Additionally, configuration fingerprints described herein can comprise unique identifiers of digital representations of configurations of corresponding devices, controllers, and/or equipment herein. A fingerprint as described herein can be generated using a defined hashing or checksum, algorithm for fingerprint generation. According to an embodiment, the blockchain component 212 can store the fingerprints 236 to an immutable blockchain ledger 224, though in other embodiments, the blockchain component 212 can store entire digital twins 226 and/or configurations 238 to an immutable blockchain ledger 224. The blockchain ledger 224 can comprise a database distributed across a network of devices or nodes in a network, and can be accessible via a plant network (e.g., plant network 116) or office network (e.g., office network 108), or directly via communicatively coupled devices, systems, components, etc. According to an embodiment, the blockchain component 212 can store the fingerprints 236 or other suitable data or information to the blockchain ledger 224 by requesting to write one or more new block(s) of data to the blockchain ledger 224. The request can be broadcast by the system 202 and/or industrial automation device 228 to all registered participants of the blockchain ledger 224. These participants can include devices, systems, or nodes that are authorized to participate in the blockchain ecosystem. Every registered participant can check hashes against defined algorithms in order to validate the request. Using a defined proof of work algorithm, participants of the blockchain ledger 224 can determine validity of the new block(s) (e.g., which may comprise the fingerprints 236, digital twin 226, configuration 238, or a piece of the digital twin 226 or configuration 238). Validity of the new block(s) can be determined based upon the participants reaching a consensus or a defined threshold for agreement (e.g., according to a defined agreement criterion) for determining validity. If consensus or a defined agreement is reached, the new block(s) can be added to the blockchain ledger 224.

According to an embodiment, the comparison component 214 can compare a first digital twin fingerprint of a digital twin 226 of the industrial automation device 228 (e.g., from a first point in time) with a second digital twin fingerprint of the industrial automation device 228 (e.g., from a second point in time, subsequent to the first point in time) in order to determine equivalency of two digital twins (e.g., for the same industrial automation device 228 from different points in time). Further, the comparison component 214 can compare a first configuration fingerprint of an industrial automation device 228 or automation system (e.g., from a first point in time) with a second configuration fingerprint of the industrial automation device 228 or automation system (e.g., from a second point in time, subsequent to the first point in time) in order to determine equivalency of two configurations of the industrial automation device 228. The comparison component 214 can also generate an output indicative of the equivalency of the digital twin 226 and/or the configuration 238. Such an output can be rendered, for instance, via the U.I. component 232 visually (e.g., on screen/display) or audibly and/or communicated to one or more external devices via the communication component 234. In this regard, the virtual configuration of the industrial automation device 228—e.g., the device's programming, I/O module configuration settings, network configuration, scale factors, or other such configuration aspects—represented by the configuration 238 via a first configuration fingerprint stored on the blockchain ledger 224 can be compared to a second configuration fingerprint of the same industrial automation device (e.g., generated at a later point in time), also stored on the blockchain ledger 224. This approach can be used, for example, to determine whether the physical automation system has been modified between the first point in time and the second point in time—e.g., by replacement of a hardware component, reprogramming of an industrial controller or other device 228, modification of one or more device configuration parameters, etc.—and to notify a user that the configuration of the automation system has changed. Similarly, a digital twin for the industrial automation device 228 represented in a first digital twin fingerprint stored on the blockchain ledger 224 can be compared to a second digital twin fingerprint for the same industrial automation device 228 (e.g., generated at later point in time), also stored on the blockchain ledger 224. Such fingerprints (e.g., of the fingerprints 236) can comprise hashed or checksummed digital representations of current and/or past configurations of the industrial automation device 228.

As noted above, the digital twin 226 for a given automation system may be designed to simulate performance or operation of the automation system (or a specific performance metric of the automation system) having a specific configuration of hardware (e.g., industrial controllers, I/O modules, motor drives, motors, actuators, sensors, etc.) and software (e.g., control programming, device configuration parameters, network settings, etc.) represented by configuration 238. In some scenarios, modifying the configuration of the automation system—e.g., by replacing a hardware component or device with a different type of component, or by reprogramming or reconfiguring an automation device 228 included in the automation system—may render the digital twin 226 invalid for use in simulating the modified automation system, since the configuration modification may cause the operation of the automation system to deviate from the mathematically represented operation defined by the digital twin 226. Consequently, a user may wish to confirm that a digital twin 226 to be used to simulate operation of the automation system is still valid for the present configuration 238 of the automation system.

Accordingly, one or more embodiments described herein can store fingerprints of both the digital twin 226 and the configuration 238 of the automation system for which the digital twin 226 was designed as a pair within a blockchain, thereby recording the association between the digital twin 226 and the automation system configuration 238 for which the digital twin 226 was developed. In an example, the comparison component 214 can determine whether the digital twin 226 is valid for a current configuration 238 based on a comparison of the second configuration fingerprint to one or more defined configuration fingerprints stored with the fingerprint of the digital twin 226 on the blockchain ledger 224 (the one or more defined configuration fingerprints representing configurations known to be compatible with the digital twin 226). In this regard, the digital twin 226 can be determined (e.g., by the comparison component 214) not to be valid for the configuration in response to a determination that the second configuration fingerprint does not match the one or more defined configuration fingerprints stored with the fingerprint of the digital twin 226.

This approach can also be useful in scenarios in which multiple versions of a digital twin 226 for an automation system are developed and archived for version control purposes. For example, a new version of a digital twin 226 may be created to capture a refinement to the previous version of the digital twin 226, or may be designed to simulate performance of the automation system 226 under a specific system configuration or operating mode. When a new version of a digital twin 226 is created, the fingerprint 236 for the digital twin 226 can be stored in a blockchain together with the fingerprint of the automation system configuration for which the new version of the digital twin 226 is valid, thereby recording the association between this version of the digital twin 226 and the system configuration 238. The digital twin 226 may then be stored together with previous versions of the digital twin 226. Using the comparison approach described above, the system 202 can inform a user as to whether a selected version of a digital twin 226 (e.g., a version of the digital twin 226 selected from the archived versions) is suitable for use with a current configuration of the automation system.

In some embodiments, an invalid configuration can be determined (e.g., by the comparison component 214) to be indicative of an unauthorized modification or alternation to the industrial automation device 228—e.g., grey market modifications—which can lead to potential system failures (e.g., failures of the industrial automation device 228 and/or associated devices, systems, or components) or may indicate proliferation of unauthorized devices in secondary markets. For example, the comparison component 214 can determine that the industrial automation device 228 comprises a modification or alternation in response to a determination that the first configuration fingerprint does not match the second configuration fingerprint. In this regard, authorization modifications or alternations can comprise one or more defined indicators or variations (or an absence of a defined indicator), which can be identified by the comparison component 214 (e.g., by differences in respective digital twins, configurations, and/or fingerprints). In various embodiments, the comparison component 214 can generate an output indicative of the equivalency of the digital twin 226 or the equivalency of the configuration 238. Such an output can be rendered via the U.I. component 232 visually (e.g., on screen/display) or audibly and/or communicated to one or more external devices via the communication component 234.

To allow for authorized modifications, such as those resulting from valid maintenance tasks, the maintenance component 216 can be configured to identify authorized maintenance actions directed to the industrial automation device 228 based on, for instance, a defined authorization criterion. To this end, some embodiments of the blockchain component 212 can store data representative of the authorized maintenance to a cloud storage (e.g., cloud platform 122) and/or the immutable blockchain ledger 224. In such embodiments, the blockchain component 212 can associate data representative of the authorized maintenance with the digital twin 226 of the industrial automation device 228 (e.g., via fingerprints representative of the authorized maintenance). Data representative of the authorized maintenance can be associated with a corresponding non-fungible token (NFT) stored to the blockchain ledger 224. In this regard, presentation of an authorized NFT can be required in order to perform maintenance or modifications, and absence of the authorized NFT can be indicative of unauthorized maintenance or modifications. In an example scenario in which the industrial automation device 228 is an industrial controller, and a physical configuration of the industrial controller can comprise an identity of an I/O or special function module installed in the industrial controller, an identity of a slot of the industrial controller in which the module is installed, or an electrical connection of the industrial controller. In order to rapidly determine equivalency or validity of the configurations as described above, the digital twin 226 and/or configuration 238 can, in one or more embodiments, comprise a vectorized data set representative of the industrial automation device 228, and vectorization can be utilized by processor 206 to execute parallel computing (e.g., multi-core computing).

In some embodiments, the immutable blockchain ledger 224 can be associated exclusively with the industrial automation device 228, thus yielding a 1:1 relationship between blockchain ledgers and industrial automation devices in which each blockchain ledger is associated with only one industrial automation device (e.g., and corresponding fingerprints 236 and/or digital twin 226). In other embodiments, a single immutable blockchain ledger 224 can be associated with a plurality of industrial automation devices 228 (e.g., a plurality of instances of the industrial automation device 228) or other suitable industrial automation devices.

According to an embodiment, the simulation component 218 can simulate data generation using the digital twin 226. This simulation can comprise generating, by the simulation component 218, first output data using the digital twin 226 and the configuration 238, based on submission of simulated or real input data to the digital 226. This first output data can comprise a simulated output of the industrial automation device 228 by utilizing the digital twin 226 to process the input data, based on the configuration defined in the configuration 238. Thus, the first output data can comprise an instruction for communicatively coupled industrial equipment (not depicted), a data output, or other suitable first output data. The input data can represent, for example, digital or analog control signals generated by an emulated or physical industrial controller and directed to digitized devices of the automation system represented by the digital twin 226. In some embodiments, the above simulation can further comprise simulating, by the simulation component 218, data generation comprising generating second output data, using the industrial automation device 228, based on the input data. The comparison component 214 can compare the first output data to the second output data. Thus, the comparison component 214 can compare an output of a digital twin of the industrial automation device 228 to an output industrial automation device 228 itself. It is noted that the data component 220 can be utilized (e.g., by the comparison component 214) to generate the second output data based on the input data and a defined algorithm or code stored on the industrial automation device 228 (and/or in the memory 204). In this regard, the second output data can comprise an actual, physical output from the industrial automation device 228, such as an instruction for communicatively coupled industrial equipment (not depicted), a data output, or other suitable second output data. Thus, the comparison component 214 can compare an actual output from the industrial automation device 228 with a simulated output of the industrial device 228 (using the digital twins 226 and configuration 238). In some scenarios, the input data can be obtained via a blockchain oracle 230 communicatively coupled to the industrial automation device 228 and/or system 202. The blockchain oracle 230 can, for instance, be registered with the blockchain ledger 224 and/or system 202 to ensure that the input data provided to the system 202 is reliable and trustworthy. In various embodiments, based on the comparison performed by the comparison component 214, and in response to the first output data being determined (e.g., by the comparison component 214) not to match the second output data, the flag component 222 can generate a notification indicating that the industrial automation device 228 has an inequivalent configuration (e.g., to the configuration 238) or is using an inequivalent digital twin 226. Conversely, in response to a determination by the comparison component 214 that the first output data matches the second output data, the flag component 222 can generate a notification that the industrial automation device 228 has an equivalent configuration to the configuration 238 and/or is using an equivalent digital twin 226.

According to an embodiment, the simulation component 218 can simulate data generation by the automation system using the digital twin 226. This simulation can comprise generating output data using the digital twin 226 and the configuration 238, based on submission of simulated or real input data to the digital twin 226. This output data can comprise a simulated output of the industrial automation device 228 by utilizing the digital twin 226 to process the input data, rather than the industrial automation device 228. In some embodiments, the simulation can comprise a physics-based simulation, and the input data can be obtained via a blockchain oracle 230 communicatively coupled to the industrial automation device 228 and/or system 202. The comparison component 214 can, based on the physics-based simulation, determine whether the output data satisfies a defined threshold (e.g., within a defined, expected range of output values). If the output data does not satisfy the defined threshold, the system 202 can render a recommendation for a design modification to bring the output data within the threshold range, indicate portion(s) of the automation system (or devices) that are out of compliance and should be redesigned or reconfigured, generate an alert indicative of the non-compliance, or execute another suitable action in accordance with one more embodiments described herein.

In various embodiments, a digital twin herein can comprise a reference digital twin, which can be applicable to a plurality of different industrial automation devices 228, or to a plurality of instances of the same industrial automation device 228. Because the plurality of instances of the industrial automation device 228 may comprise a common configuration, the plurality of instances of the industrial automation device 228 can be expected to perform identically or with a defined acceptable amount of deviation from an expected performance metric. Accordingly, the reference digital twin can record one or both of expected device configurations or expected operating behaviors for the device 228. In some implementations, the expected operating behaviors can be recorded in the digital twin and/or on the blockchain ledger 224 as expected ranges of one or more performance metrics, such as expected operating speeds; expected operating sequence timings; expected temperatures, pressures, or fluid flows; expected product throughput; expected power consumption; or other such metrics. The comparison component 214 can compare configurations and/or outputs of the plurality of instances of the industrial automation device 228 to one another or to the reference digital twin in order to determine equivalence or validity of the configuration or simulated operating behavior of each of the plurality of instances of the industrial automation device 228. According to an example, the comparison component 214 can compare the first digital twin fingerprint to a third digital twin fingerprint of a second digital twin of a second industrial automation component (e.g., another instance of the industrial automation device 228 or a different industrial automation component). In response to a determination, based on a result of this comparison, that the first digital twin fingerprint does not match the third digital twin fingerprint, the flag component 222 can be configured to render a notification that the first industrial automation component and the second industrial automation component do not match (e.g., are not equivalent). For example, the notification can be rendered on a client device in order to alert a user to the mismatch. Additionally, the notification can identify the part(s) of the configuration that are noncompliant and can comprise a recommendation for how to remedy the mismatch. In some embodiments, the flag component 222 can also generate a recommendation for modifying first or second industrial automation component in order to bring an inequivalent or invalid configuration into consistency with the configuration defined by the reference digital twin and its corresponding fingerprint.

According to an embodiment, the U.I. component 232 can perform visualization functions similar to those of HMI 114, including rendering telemetry and/or status data associated with the system 202. For example, the U.I. component 232 can generate visualizations and/or audible alerts associated with flags generated by the flag component 222. Further, the communication component 234 can send or receive data associated with the system 202. For example, the communication component 234 can facilitate communication between the system 202, office network 108, plant network 116, blockchain ledger 124, and/or corresponding devices, systems, components, platforms, etc. The communication component 234 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 3:
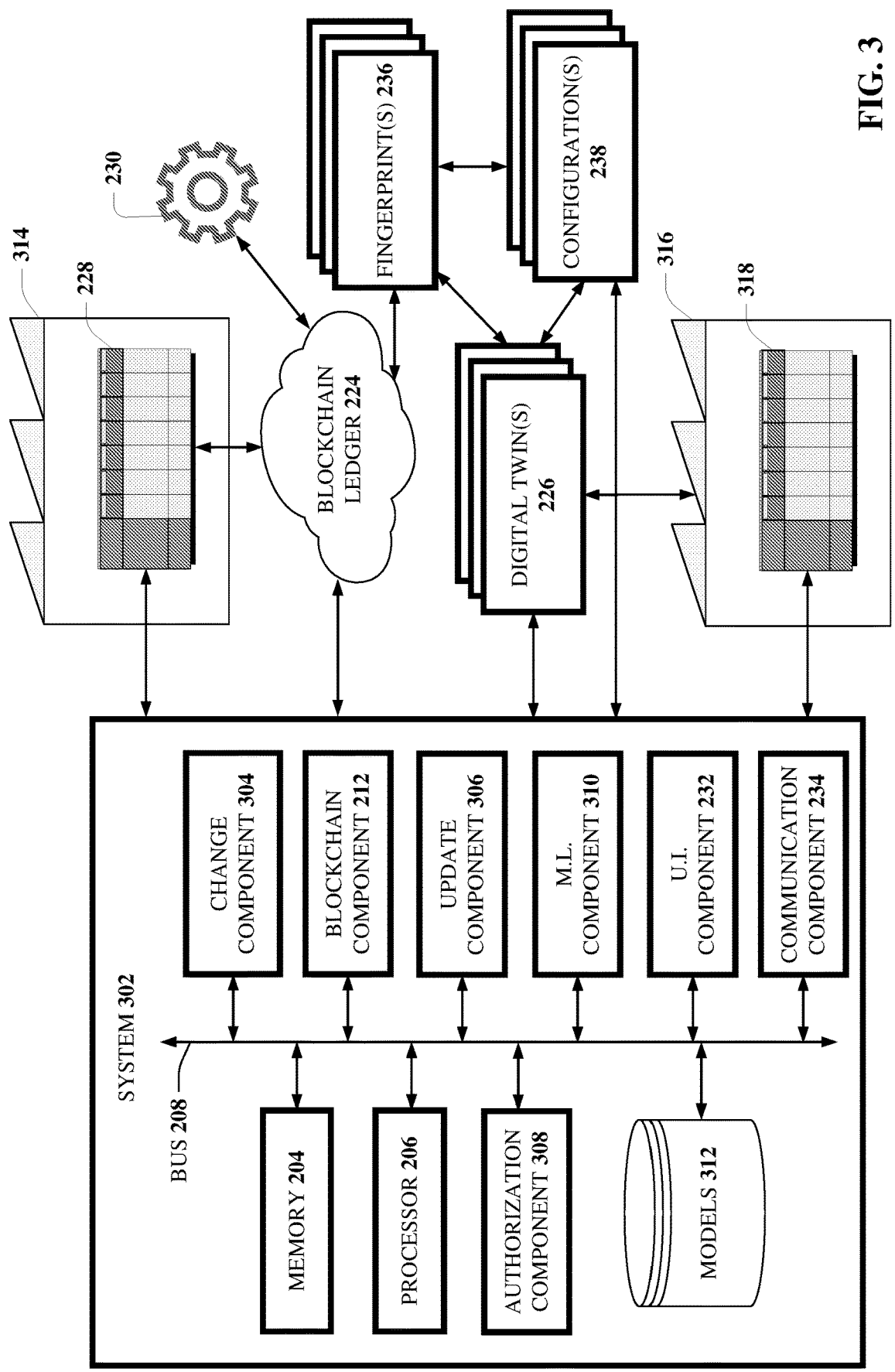
FIG. 3 is a block diagram of an exemplary system in accordance with one or more embodiments described herein.

FIG. 3 is a diagram of an example, non-limiting system 302 configured to, for instance, provide blockchain services across one or more industrial facilities in accordance with one or more embodiments herein. System 302 can comprise a computerized tool, which can be configured to perform various operations relating to industrial blockchain digital twin change management. The system 302 can comprise one or more of a variety of components, such as memory 204, processor 206, bus 208, change component 304, blockchain component 212, update component 306, authorization component 308, machine learning (M.L.) component 310, model(s) 312, U.I. component 232, and/or communication component 234. In various embodiments, the system 302 can be communicatively coupled to, or can further comprise, blockchain ledger 224, digital twin(s) 226, industrial automation device 228 (e.g., within facility 314), blockchain oracle 230, fingerprint(s) 236, configuration(s) 238, and/or industrial automation device 318 (e.g., within facility 316). In various embodiments, one or more of the memory 204, processor 206, bus 208, change component 304, blockchain component 212, update component 306, authorization component 308, M.L. component 310, model(s) 312, U.I. component 232, communication component 234, blockchain ledger 224, digital twin(s) 226, industrial automation device 228, blockchain oracle 230, fingerprint(s) 236, configuration(s) 238, industrial automation device 318, and/or facility 316 can be communicatively or operably coupled (e.g., over a bus or wireless network) to one another to perform one or more functions of the system 302. In various embodiments herein, the industrial automation device 228, industrial automation device 318, or other suitable industrial automation devices or systems can comprise a programmable logic controller, a motor drive, a telemetry device, or a safety relay.

According to an embodiment, the blockchain component 212 can store a digital twin fingerprint (e.g., of fingerprints 236) for a digital twin 226 of an industrial automation device 228 to an immutable blockchain ledger 224 and store a configuration fingerprint (e.g., of fingerprints 236) representative of a configuration of the industrial automation device 228 to the immutable blockchain ledger 224. In various embodiments, the blockchain ledger 224 can comprise a database distributed across a network of devices or nodes in a network, and can be accessible via a plant network (e.g., plant network 116) or office network (e.g., office network 108), or directly via communicatively coupled devices, systems, components, etc. According to an embodiment, the blockchain component 212 can store the fingerprints 236 to the blockchain ledger 224 by requesting to write one or more new block(s) of data to the blockchain ledger 224. The request can be broadcast to all registered participants of the blockchain ledger 224. These participants can include devices, systems, or nodes that are authorized to participate in the blockchain ecosystem. Every registered participant can check hashes against defined algorithms in order to validate the request. Using a defined proof of work algorithm, participants of the blockchain ledger 224 can determine validity of the new block(s) (e.g., which may comprise the fingerprint(s) 236, the digital twin 226, or a piece of the digital twin 226). Validity of the new block(s) can be determined based upon the participants reaching a consensus or a defined threshold for agreement (e.g., according to a defined agreement criterion) for determining validity. If consensus or a defined agreement is reached, the new block(s) can be added to the blockchain ledger 224.

According to an embodiment, the change component 304 can identify a change to the industrial automation device (e.g., industrial automation device 228 and/or industrial automation device 318). For example, the change can comprise a hardware change, software change, or factory configuration change applied to the industrial automation device 228 and/or industrial automation device 318. Based on detection of this change, the update component 306 can facilitate creation of an updated digital twin, representative of the change and/or update the digital twin fingerprint and configuration fingerprint based on the change (e.g., replacing the fingerprints stored in the blockchain ledger 224). Therefore, the digital twin fingerprint and/or the configuration fingerprint can be updated or replaced with each change to the industrial automation device 228 and/or industrial automation device 318. By generating an updated digital twin, the digital twin 226 and/or configuration 238 are effectively updated to reflect the change, thereby bringing the digital twin 226 and/or configuration 238 into conformity with the industrial automation device 228 and/or industrial automation device 318.

According to an embodiment, the authorization component 308 can determine whether the change is an authorized change that complies with a defined authorization criterion. In various examples, the authorization criterion can be defined in terms of a permitted range of values for respective different device configuration parameters or hardware settings, permitted users or user roles that are permitted to submit modifications to the device 228 or 318, identities of I/O modules or special function modules that are permitted to be installed on the device 228 or 318, or other suitable factors. Upon detection of an authorized change to device 228 or 318, the blockchain component 212 can store data representative of the authorized change to a cloud storage and/or the immutable blockchain ledger 224. In some embodiments, the blockchain component 212 can associate the data representative of the authorized change with a digital twin fingerprint and/or configuration fingerprint. In some embodiments, data representative of the authorized change can be associated with a corresponding non-fungible token (NFT) stored to the blockchain ledger 224. In this regard, presentation of an authorized NFT can be required in order to perform changes, and absence of the authorized NFT can be indicative of unauthorized change. In further embodiments, the change component 304 can determine the change using a change model (e.g., of the models 312) generated using machine learning (e.g., via the M.L. component 310) applied to past changes other than the change. In this regard, the M.L. component 310 can analyze past changes to industrial automation devices (e.g., comprising authorized changes and unauthorized changes) in order to generate the change model. This change model can then be employed by the change component 304 in this instance, and in future instances, to determine current changes and future changes to industrial automation devices. The change model can also be updated over time based on accuracy of the change model as determined using changes made by the change component 304 that relied on the change model. The change component 304 can therefore utilize the change model to determine changes herein and/or analyze the changes for validity.

In some embodiments, the system 302 can record changes applied to a first device on a corresponding digital twin 226 of that device (e.g., industrial automation device 228 and/or 318), and update other digital twins for other similar devices to reflect the change. This allows a change made to a device or system to be automatically propagated to similar devices or systems within the facility, or at other facilities. According to an embodiment, the update component 306 can apply the change to other digital twins, other than the digital twin 226. In this regard, the other digital twins can represent respective industrial automation devices (e.g., industrial automation device 318 or different industrial automation devices), other than the industrial automation device 228. For instance, the digital twin 226 can be applicable to the industrial automation device 228, and such other digital twins can be applicable to industrial automation device different from the industrial automation device 228, such as the industrial automation device 318. In this regard, the change can be applied to digital twins other digital twins of other industrial automation devices other than the industrial automation device on which the change was initially applied. The industrial automation device 228 and the aforementioned industrial automation devices can comprise respective instances of a common hardware configuration. In various implementations, the industrial automation device 228 reside at a first facility 314, and one or more of the other industrial automation devices (e.g., industrial automation device 318 or another suitable industrial automation device) can reside at a second facility 316, other than the first facility 314. These facilities 314 and 316 can be located at a common plant or can be located at different geographical locations entirely. In some embodiments, the change (e.g., virtual change to a digital twin) can be applied to the other digital twins in response to a determination (e.g., by the update component 306 and according to a defined criterion) that the change was applied successfully. For example, the success of the change can be verified using cryptographic measurements of the change and corresponding measurements of an industrial device after applying the change. In various embodiments, the change can comprise a software change, such as an update, and verification of the change can comprise a determination of whether the software change was successfully and/or properly installed. In another example, a determination of whether the change caused the industrial automation device to behave in an expected way (e.g., after application of the change) can be determined. If the measurements are determined to match (e.g., by the update component 306), the change can be determined to be successful. In various implementations, the immutable blockchain ledger 224 can comprise digital twins 226 of multiple units of industrial automation equipment, comprising the industrial automation equipment (e.g., industrial automation device 228), located at a common facility (e.g., facility 314).

In one or more embodiments, the change component 304 can query or poll the industrial device (e.g., at defined intervals or random intervals) to determine whether a change (e.g., a hardware or software change to an industrial device) was applied. In other embodiments, the change component 304 can record the change in response to a maintenance or repair event associated with the industrial automation equipment (e.g., industrial automation device 228). In other embodiments, the change component 304 can record the change in response to a failure event associated with the industrial automation equipment (e.g., industrial automation device 228).

Various embodiments described herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

Systems and/or associated controllers, servers, or machine learning components described herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 310 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 310. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an ML component 310 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 310 can perform a utility-based analysis that factors cost of initiating the above-described operations versus benefit. In this embodiment, the ML component 310 can use one or more additional context conditions to determine various thresholds herein.

To facilitate the above-described functions, a ML component 310 herein can perform classifications, correlations, inferences, and/or expressions associated with principles of artificial intelligence. For instance, the ML component 310 can employ an automatic classification system and/or an automatic classification. In one example, the ML component 310 can employ a probabilistic and/or statistical-based analysis (e.g., factoring into the analysis utilities and costs) to learn and/or generate inferences. The ML component 310 can employ any suitable machine-learning based techniques, statistical-based techniques and/or probabilistic-based techniques. For example, the ML component 310 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 310 can perform a set of machine-learning computations. For instance, the ML component 310 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 4:
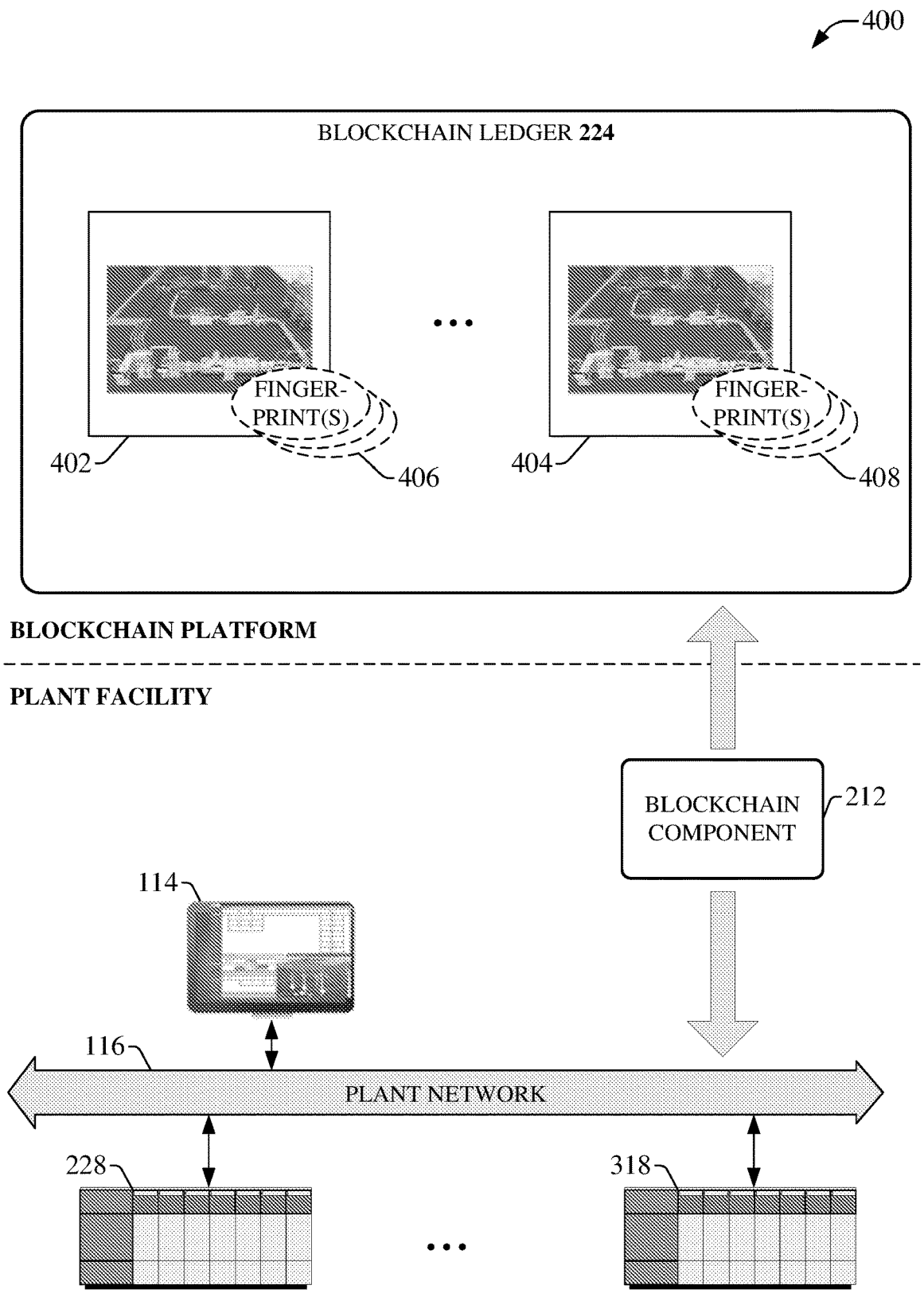
FIG. 4 is a block diagram of an example industrial control environment in accordance with one or more embodiments described herein.

FIG. 4 is a diagram illustrating an example industrial control environment 400 in accordance with one or more embodiments described herein. The plant network 116 can communicatively couple one or more industrial automation devices or components (e.g., industrial automation device 228, industrial automation device 318, industrial controller 118, or another industrial automation component, controller, system, etc.), HMIs 114, or other components, systems, devices, etc. According to an embodiment, the blockchain component 212 (e.g., of a system 202 and/or system 302) can read and/or write to the blockchain ledger 224 using bidirectional communication as previously described. In various embodiments, the blockchain ledger 224 can store industrial automation data representative of a variety of industrial automation configurations, fingerprints, digital twins, and/or other suitable industrial automation data.

According to an embodiment, the blockchain ledger 224 can store a fingerprint of a virtual facility 402, comprising a digital representation of an industrial automation facility and its respective hardware and/or software. According to an example, digital twin(s) for industrial automation devices and/or corresponding (digital) configurations can be a part of the virtual facility 402, which can thus comprise digital replicas of respective industrial automation equipment located in a physical facility, represented by the virtual facility 402. In this regard, the virtual facility 402 can be made up of digital twins and (digital) configurations representing devices in a physical facility, represented by the virtual facility 402, and stored to a cloud storage or blockchain storage herein. Similarly, digital twin(s) of industrial automation devices and corresponding (digital) configuration(s) can be part of the virtual facility 404, which can thus comprise digital replicas of respective physical industrial automation equipment located in another physical facility, represented by the virtual facility 404. In this regard, the virtual facility 404 can be made up of digital twins and configurations representing physical devices in a physical facility represented by the virtual facility 404. In some embodiments, fingerprints 406 or 408 can comprise digital twins and/or configurations of an entire physical facility herein.

Figure 5:
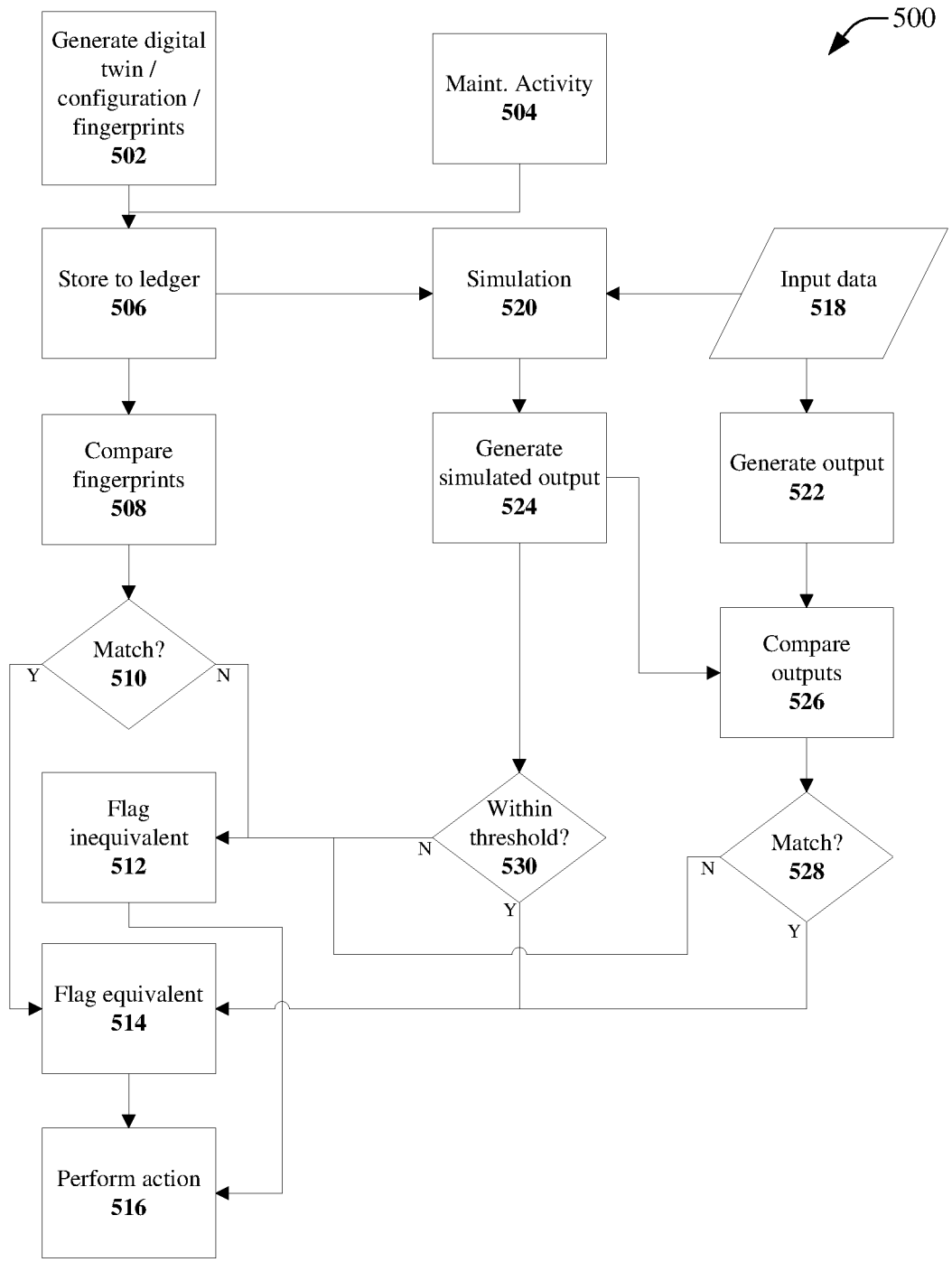
FIG. 5 is a flowchart of a process associated with blockchain-enabled digital twins for industrial automation systems in accordance with one or more embodiments described herein.

FIG. 5 is a flowchart of a process 500 associated with blockchain-enabled digital twins for industrial automation systems in accordance with one or more embodiments described herein. At 502 a digital twin (e.g., digital twin 226) applicable to industrial automation equipment (e.g., industrial automation device 228), a (digital) configuration 238 of the industrial automation equipment, a first digital twin fingerprint, and/or a first configuration fingerprint can be generated (e.g., by the generation component 210). At 506 the first digital twin fingerprint and/or the first configuration fingerprint can be stored (e.g., by the blockchain component 212) to an immutable blockchain ledger (e.g., blockchain ledger 224). In some scenarios, data representative of a maintenance activity (e.g., authorized maintenance activity identified or detected by the maintenance component 216) at 504 can additionally or alternatively be stored to the blockchain ledger at 506 (e.g., using a corresponding fingerprint). Such a maintenance activity can comprise a software and/or hardware update or modification to an industrial automation device herein.

At 508, comparison(s) of one or more fingerprints can be performed (e.g., by the comparison component 214). For example, the comparison component 214 can compare the first digital twin fingerprint (e.g., from a first point in time) and a second digital twin fingerprint (e.g., from a second point in time, after the first point in time and generated based on the same industrial automation equipment) in order to determine equivalency of the digital twin. Similarly, the comparison component 214 can compare a first configuration fingerprint for an industrial automation device (e.g., from a first point in time) and a second configuration fingerprint for the same industrial automation device (e.g., from a second point in time, after the first point in time) in order to determine equivalency of the configuration of the industrial automation device over time, different versions, different iterations, etc. If at 510, the first digital twin fingerprint and the second digital twin fingerprint are determined to match and/or the first configuration fingerprint and the second configuration fingerprint are determined to match (e.g., Y at 510), the configuration, digital twin, and/or industrial automation device can be flagged (e.g., via the flag component 222) as equivalent at 514. Conversely, if at 510, the first digital twin fingerprint and the second digital twin fingerprint are determined not to match and/or the first configuration fingerprint and the second configuration fingerprint are determined not to match (e.g., N at 510), the configuration, digital twin, and/or industrial automation device can be flagged (e.g., via the flag component 222) as inequivalent at 512. At 516, one or more actions associated with equivalent or inequivalent configurations or digital twins can be performed. For example, one or more alerts or notifications can be generated (e.g., via the communication component 234 and/or U.I. component 232). To render these notifications, the U.I. component 232 can generate visualizations and/or audible alerts associated with flags generated by the flag component 222. In further implementations, the corresponding industrial automation device 228 can be deenergized, placed in a safe operating mode, or locked to facilitate compliance or promote security in an industrial facility.

At 520, a simulation (e.g., a physics-based simulation as described herein) can be performed (e.g., by the simulation component 218) using the digital twin 226, configuration 238, and input data 518 (e.g., obtained via a blockchain oracle 230). The input data can represent, for example, digital or analog control signals generated by an emulated or physical industrial controller and directed to digitized devices of the automation system represented by the digital twin 226 and/or configuration 238. The simulation component 218 can then generate a simulated output at 524 using the digital twin 226, configuration 238, and the input data 518. At 530, if the output from 524 is within a defined threshold (e.g., Y at 530), the digital twin 226 and/or configuration 238 can be flagged (e.g., via the flag component 222) as equivalent at 514. Conversely, if at 520, the output from 524 is not within a defined threshold (e.g., N at 530), the digital twin 226 and/or configuration 238 can be flagged (e.g., via the flag component 222) as inequivalent at 512.

At 522, an output can be simulated (e.g., via the industrial automation device 228) based on the input data 518. At 526, the output generated at 522 can be compared with the simulated output generated at 524. If at 528, the simulated output from 524 matches the output from 522 (e.g., Y at 528), the digital twin 226, configuration 238, and/or industrial automation device 228 can be flagged as equivalent (e.g., via the flag component 222) at 514. Conversely, if at 528, the simulated output from 524 does not match the output from 522 (e.g., N at 528), the digital twin 226, configuration 238, and/or industrial automation device 228 can be flagged as inequivalent (e.g., via the flag component 222) at 512.

Figure 6:
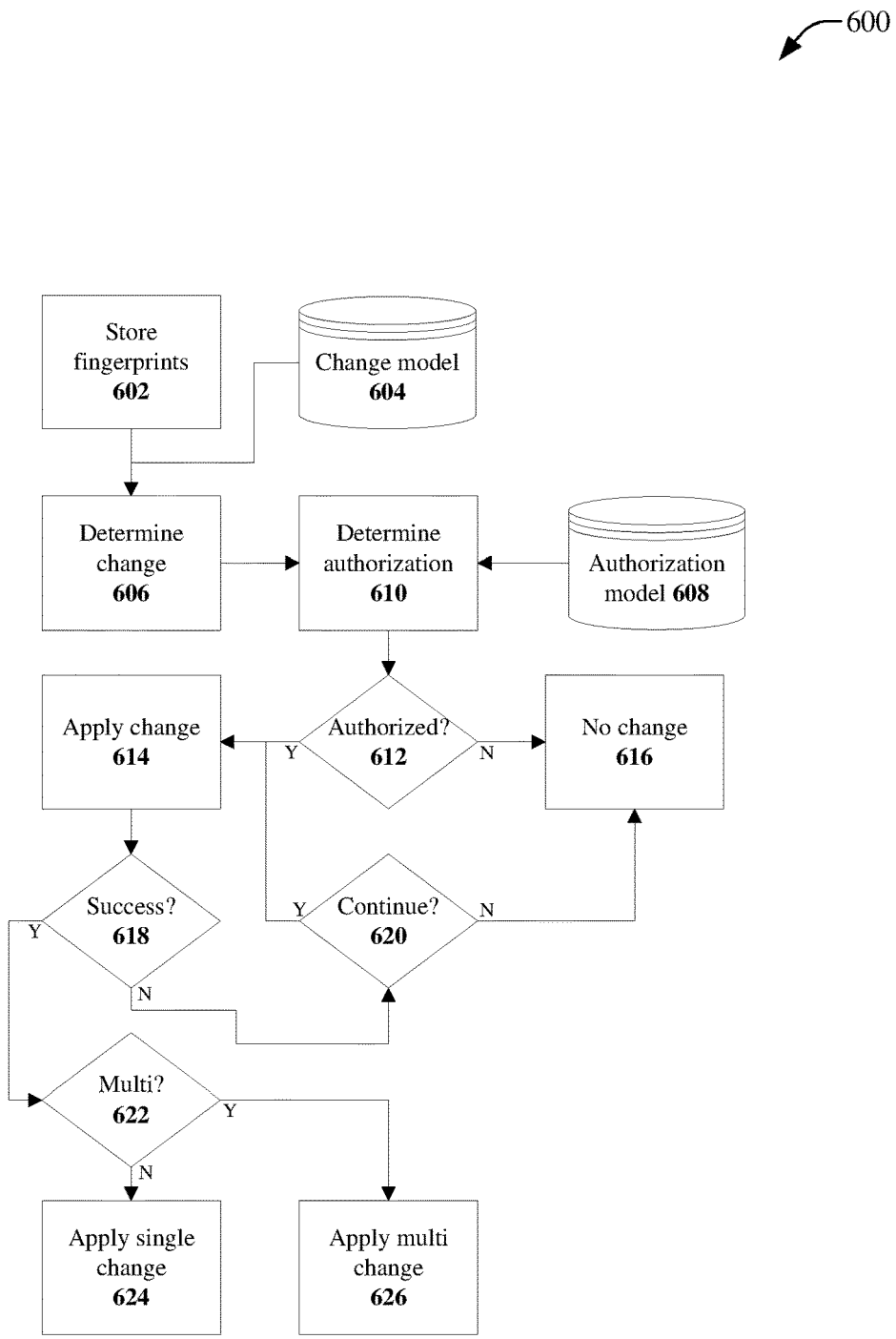
FIG. 6 is a flowchart of a process associated with industrial blockchain digital twin change management in accordance with one or more embodiments described herein.

FIG. 6 illustrates a flowchart of a process 600 associated with industrial blockchain digital twin change management in accordance with one or more embodiments described herein. At 602, a digital twin fingerprint (e.g., of the fingerprints 236) for a digital twin (e.g., digital twin 226) of an industrial automation device (e.g., industrial automation device 228 and/or industrial automation device 318) and/or a configuration fingerprint representative of a digital configuration (e.g., based on a physical configuration of the industrial automation device, such as industrial automation device 228 and/or industrial automation device 318) can be stored (e.g., by a blockchain component 212) to an immutable blockchain ledger (e.g., blockchain ledger 224). At 606, a change component 304 can detect a change to the industrial automation device (e.g., industrial automation device 228 and/or industrial automation device 318). The change component 304 can determine the change using a change model (e.g., change model 604) generated using machine learning (e.g., via a M.L. component 310) applied to past changes other than the change. This change model can then be employed by the change component 304 in this instance and in future instances to determine current changes and future changes. The change model can also be updated over time based on accuracy of the change model as determined using changes made by the change component 304 that relied on the change model. At 610, authorization of the change can be determined (e.g., by the authorization component 308). In some embodiments, the authorization component 308 can determine the authorization using an authorization model (e.g., authorization model 608) generated using machine learning (e.g., via the M.L. component 310) applied to past changes other than the change. This authorization model can then be employed by the authorization component 308 in this instance and in future instances to determine current authorizations and future authorizations. The authorization model can also be updated over time based on accuracy of the authorization model as determined using authorization determinations made by the authorization component 308 that relied on the authorization model. At 612, if the change was authorized (e.g., Y at 612), the change can be applied (e.g., by the update component 306) to the digital twin, digital twin fingerprint, and/or configuration fingerprint at 614. Conversely, at 612, if the change was not authorized (e.g., N at 612), the change is not applied at 616.

At 618, if the change from 614 was successfully applied (e.g., by the update component 306) (e.g., Y at 618), the process can proceed to 622. Conversely, if at 618, the change was not successfully applied (e.g., by the update component 306) (e.g., N at 618), the process can proceed to 620, at which the change can be reattempted at 614 if the change is configured for a reattempt (e.g., Y at 620), or can proceed to 616 if the change is not configured for a reattempt (e.g., N at 620).

At 622, if the successful change comprises a multi-change (e.g., a change applied to multiple devices and thus applicable to other digital twins or configurations, other than the digital twin 226 and configuration 238, and their corresponding fingerprints) (e.g., Y at 622), the process can proceed to 626 at which the change is applied to the other digital twins and/or configurations, and their corresponding fingerprints (e.g., via the update component 306). Conversely, if at 622, the successful change comprises a single change (e.g., to be applied only to a single digital twin or configuration, such as the digital twin 226 and configuration 238) (e.g., N at 622), the process can proceed to 624 at which the single change is applied to the single digital twin, configuration, and/or their corresponding fingerprints (e.g., by the update component 306).

Figure 7:
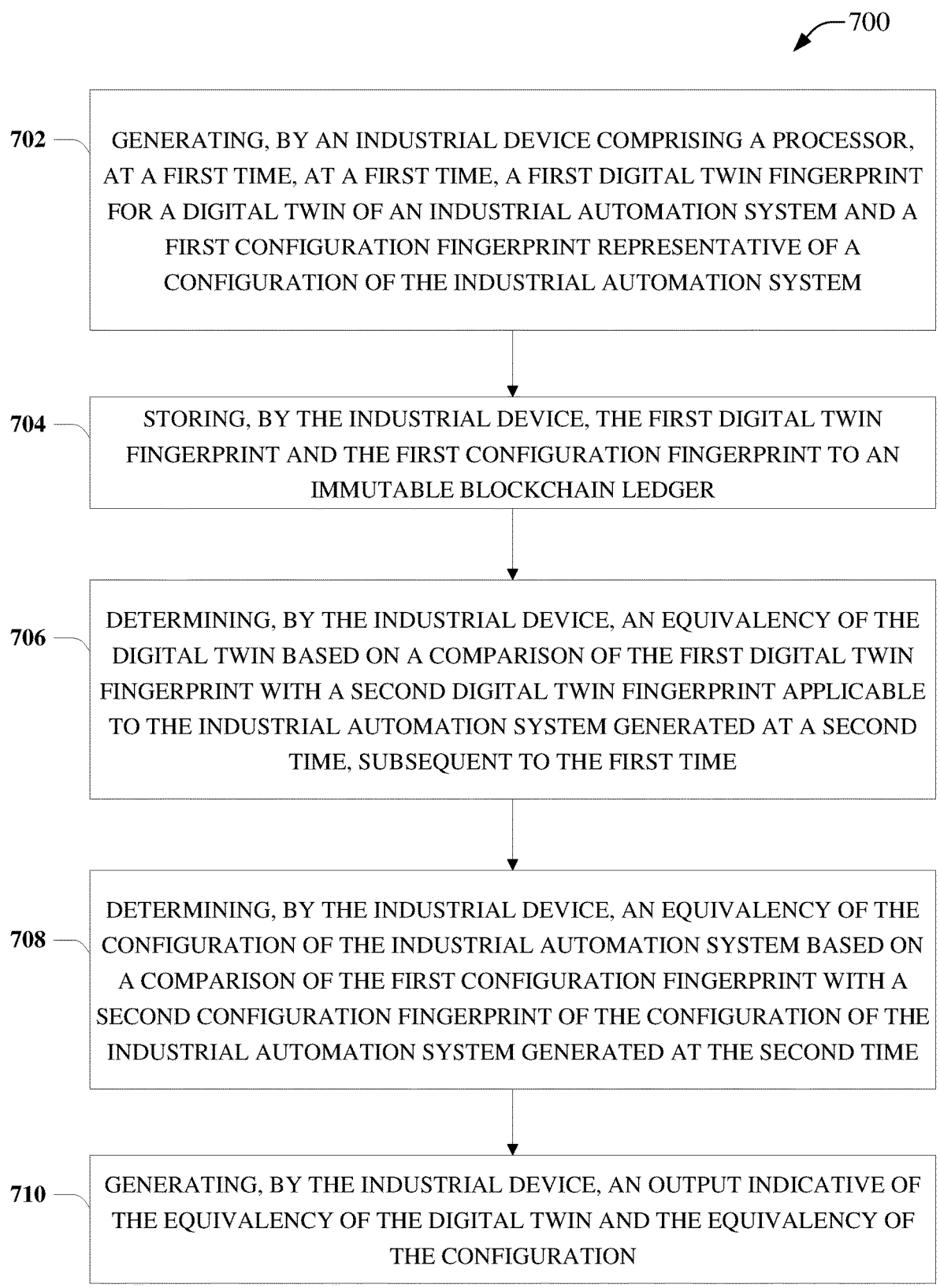
FIG. 7 is a block flow diagram for a process associated with blockchain-enabled digital twins for industrial automation systems in accordance with one or more embodiments described herein.

FIG. 7 is a block flow diagram of a process 700 for using blockchain-enabled digital twins to verify industrial automation system configurations in accordance with one or more embodiments described herein. At 702, a first digital twin fingerprint (e.g., of fingerprints 236) for a digital twin (e.g., digital twin 226) of an industrial automation system (e.g., comprising industrial automation device 228) and a first configuration fingerprint representative of a configuration of the industrial automation system (e.g., comprising industrial automation device 228) are generated (e.g., at a first time) by an industrial device comprising a processor (e.g., by the generation component 210). The industrial device may be part of, or coupled too, system 202. At 704, the first digital twin fingerprint and the first configuration fingerprint are stored (e.g., by the blockchain component 212) to an immutable blockchain ledger (e.g., blockchain ledger 224) by the industrial device. At 706, equivalency of the digital twin of the industrial automation system (e.g., comprising industrial automation device 228) can be determined based on a comparison (e.g., by the comparison component 214) of the first digital twin fingerprint (e.g., from a first point in time) with a second digital twin fingerprint for the digital twin, generated subsequent to the first digital twin fingerprint. At 708, equivalency of the configuration of the industrial automation system (e.g., comprising industrial automation device 228) can be determined based on a comparison (e.g., by the comparison component 214) of the first configuration fingerprint (e.g., from a first point in time) with a second configuration fingerprint for the industrial automation system, generated at the second time (e.g., subsequent to the first point in time). At 710, the industrial device can generate an output indicative of the equivalency of the digital twin and the equivalency of the configuration (e.g., via the communication component 234, U.I. component 232, and/or another suitable component of the system 202 and/or industrial device 228).

Figure 8:
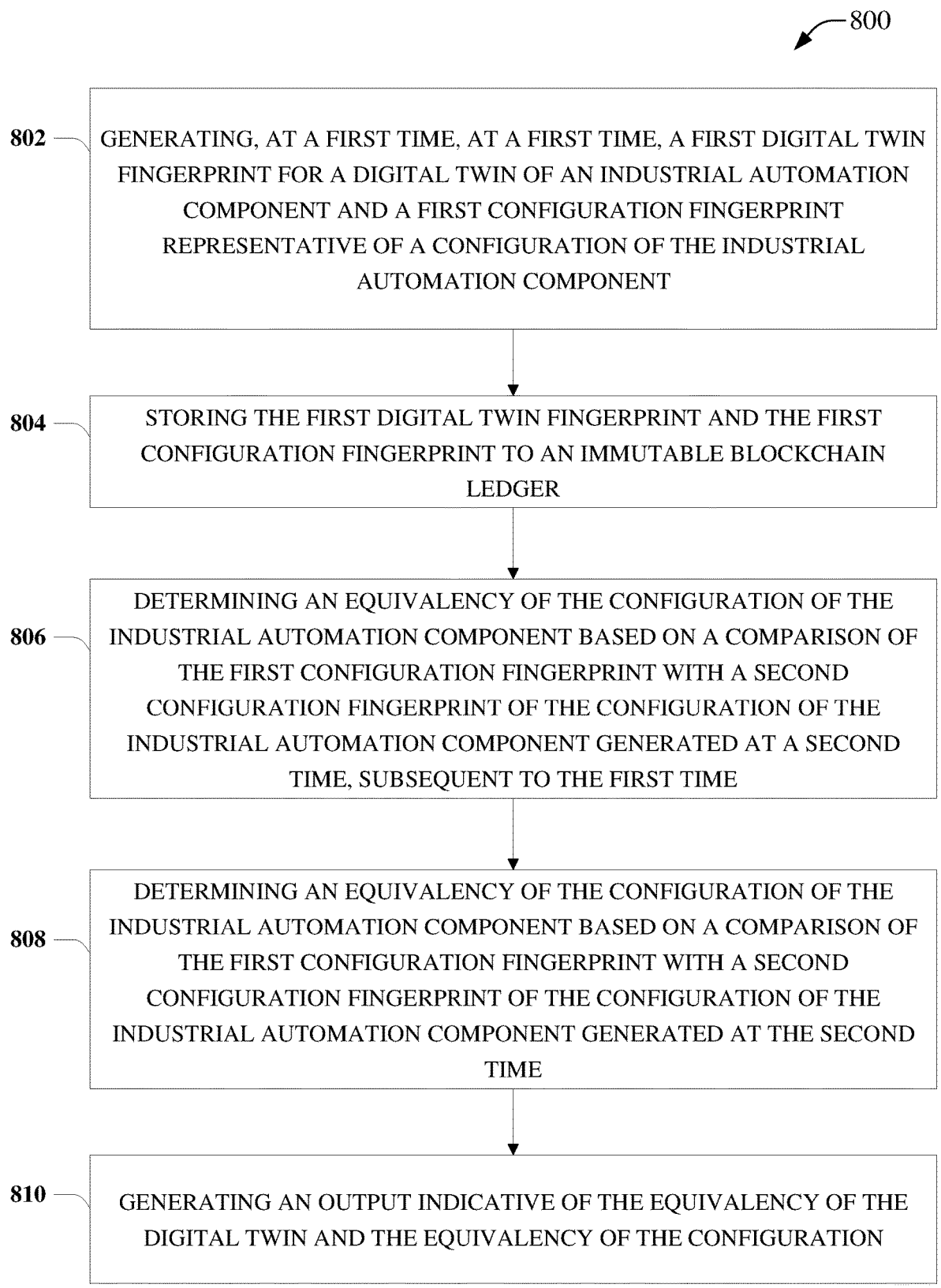
FIG. 8 is a block flow diagram for a process associated with blockchain-enabled digital twins for industrial automation systems in accordance with one or more embodiments described herein.

FIG. 8 is a block flow diagram of a process 800 associated with blockchain-enabled digital twins for industrial automation systems in accordance with one or more embodiments described herein. At 802, a first digital twin fingerprint (e.g., of fingerprints 236) for a digital twin (e.g., digital twin 226) of an industrial automation component (e.g., industrial automation device 228) and a first configuration fingerprint representative of a configuration of the industrial automation component (e.g., industrial automation device 228) are generated (e.g., at a first time) by the generation component 210. At 804, the first digital twin fingerprint and the first configuration fingerprint are stored by the blockchain component 212 to an immutable blockchain ledger (e.g., blockchain ledger 224). At 806, equivalency of the digital twin of the industrial automation component (e.g., industrial automation device 228) can be determined based on a comparison (e.g., by the comparison component 214) of the first digital twin fingerprint (e.g., from a first point in time) with a second digital twin fingerprint for the digital twin, generated subsequent to the first digital twin fingerprint. At 808, equivalency of the configuration of the industrial automation component (e.g., industrial automation device 228) can be determined based on a comparison (e.g., by the comparison component 214) of the first configuration fingerprint (e.g., from a first point in time) with a second configuration fingerprint for the industrial automation component, generated at the second time (e.g., a current time). At 810, the communication component 234, U.I. component 232, and/or another suitable component of the system 202 and/or industrial device 228 can generate an output indicative of the equivalency of the digital twin and the equivalency of the configuration.

Figure 9:
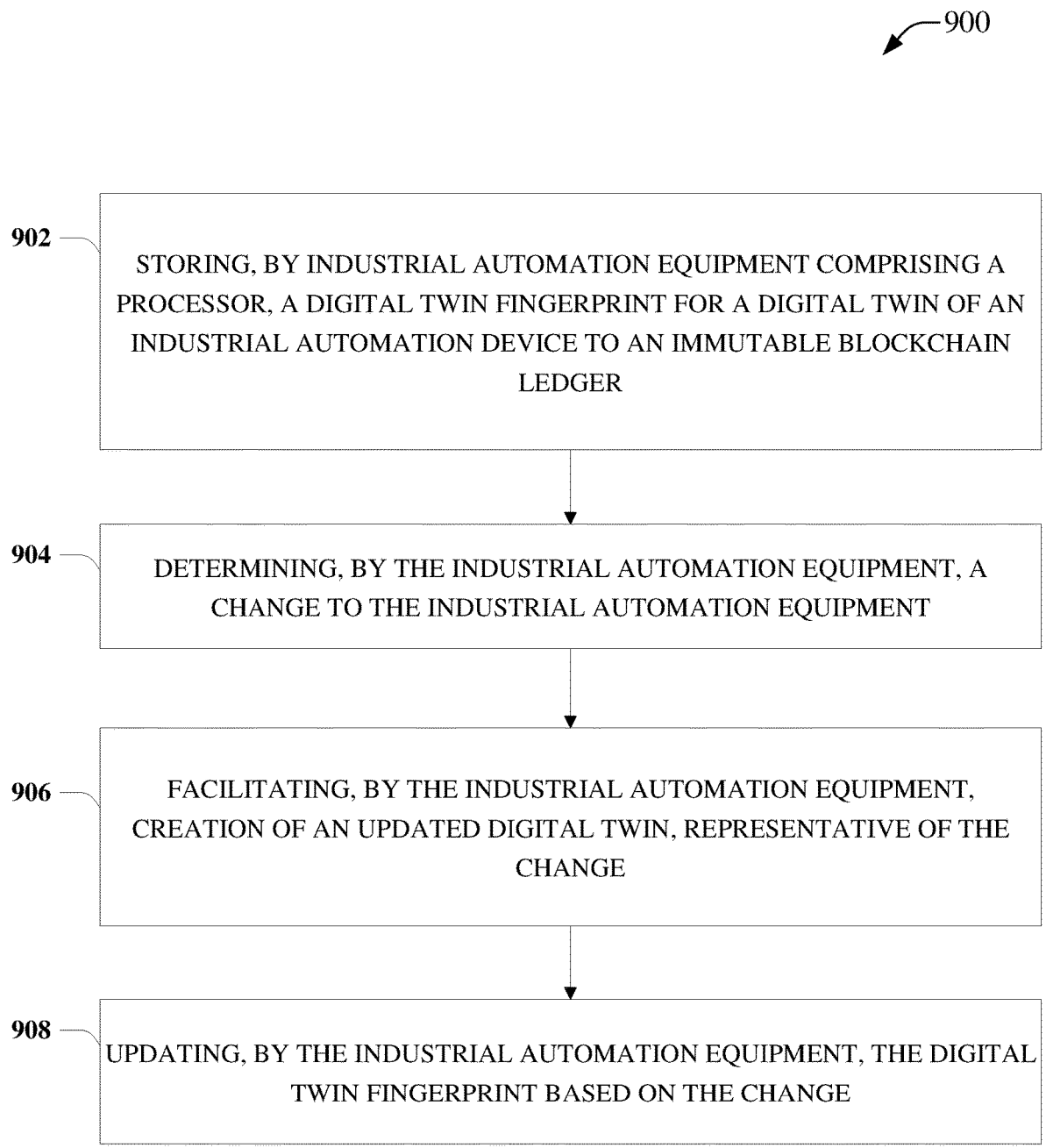
FIG. 9 is a block flow diagram for a process associated with industrial blockchain digital twin change management in accordance with one or more embodiments described herein.

FIG. 9 is a block flow diagram of a process 900 for using blockchain-enabled digital twins to propagate changes applied to industrial automation systems in accordance with one or more embodiments described herein. At 902, a digital twin fingerprint (e.g., of fingerprints 236) for a digital twin (e.g., digital twin 226) of the industrial automation equipment comprising a processor can be stored to an immutable blockchain ledger (e.g., blockchain ledger 224) by industrial automation equipment. The industrial automation equipment can be part of, or communicatively coupled to, system 202 or 302. At 904, a change to the industrial automation equipment can be determined by the industrial automation equipment (e.g., via the change component 304). At 906, the industrial automation equipment can facilitate (e.g., via the change component 304 or update component 306) creation of an updated digital twin, representative of the change. At 908, the digital twin fingerprint can be updated or replaced (e.g., via the update component 306), based on the change.

Figure 10:
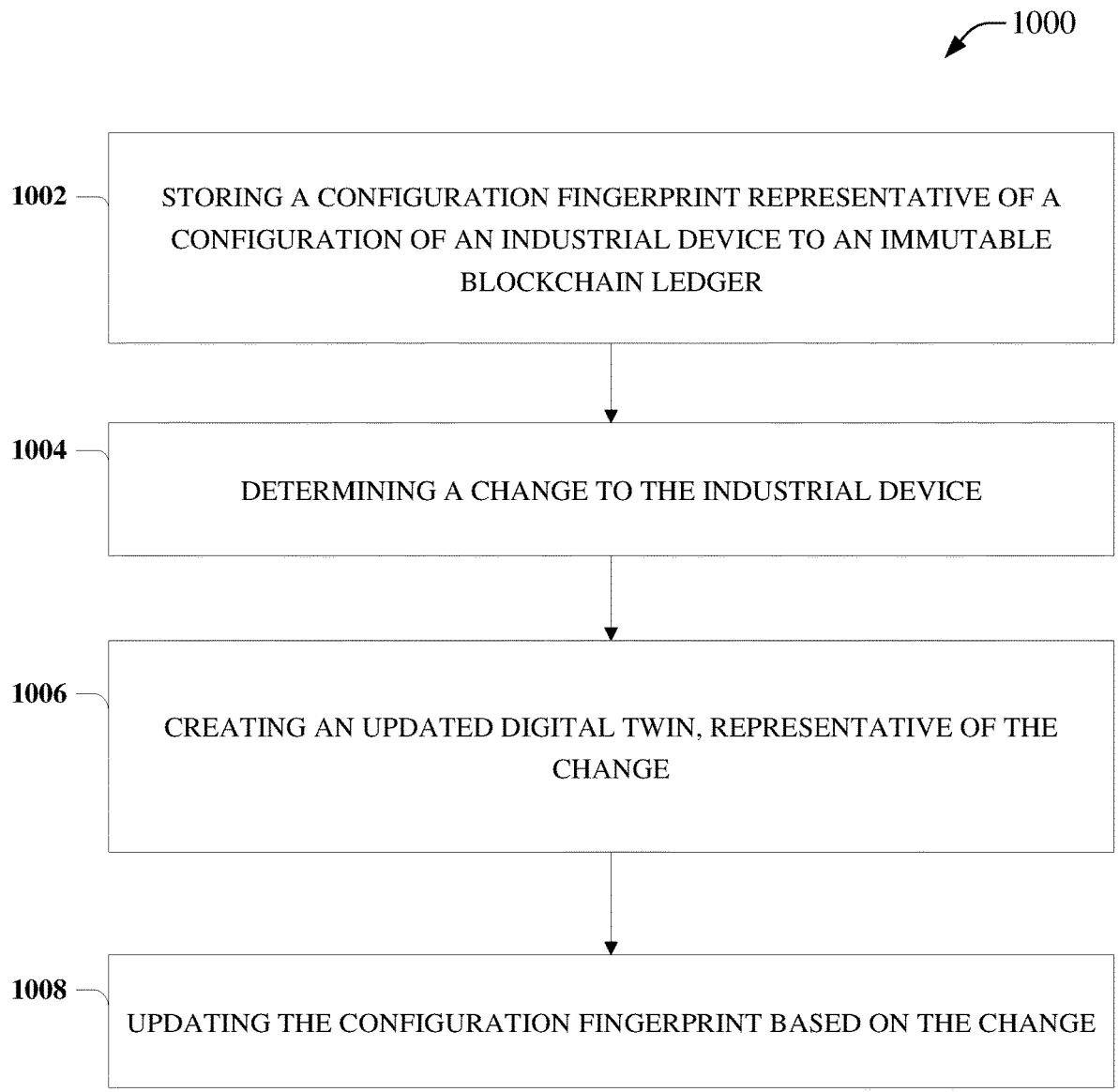
FIG. 10 is a block flow diagram for a process associated with industrial blockchain digital twin change management in accordance with one or more embodiments described herein.

FIG. 10 illustrates a block flow diagram of a process 1000 associated with blockchain-enabled digital twins for industrial automation systems in accordance with one or more embodiments described herein. At 1002, the process 1000 can comprise storing (e.g., via the blockchain component 212), a configuration fingerprint (e.g., of the fingerprints 236) representative of a configuration of an industrial device to an immutable blockchain ledger (e.g., blockchain ledger 224). At 1004, the process 1000 can comprise determining (e.g., via the change component 304) a change to the industrial device. At 1006, the process 1000 can comprise creating (e.g., via the update component 306) an updated digital twin, representative of the change. At 1008, the configuration fingerprint can be updated or replaced (e.g., via the update component 306), based on the change.

Figure 11:
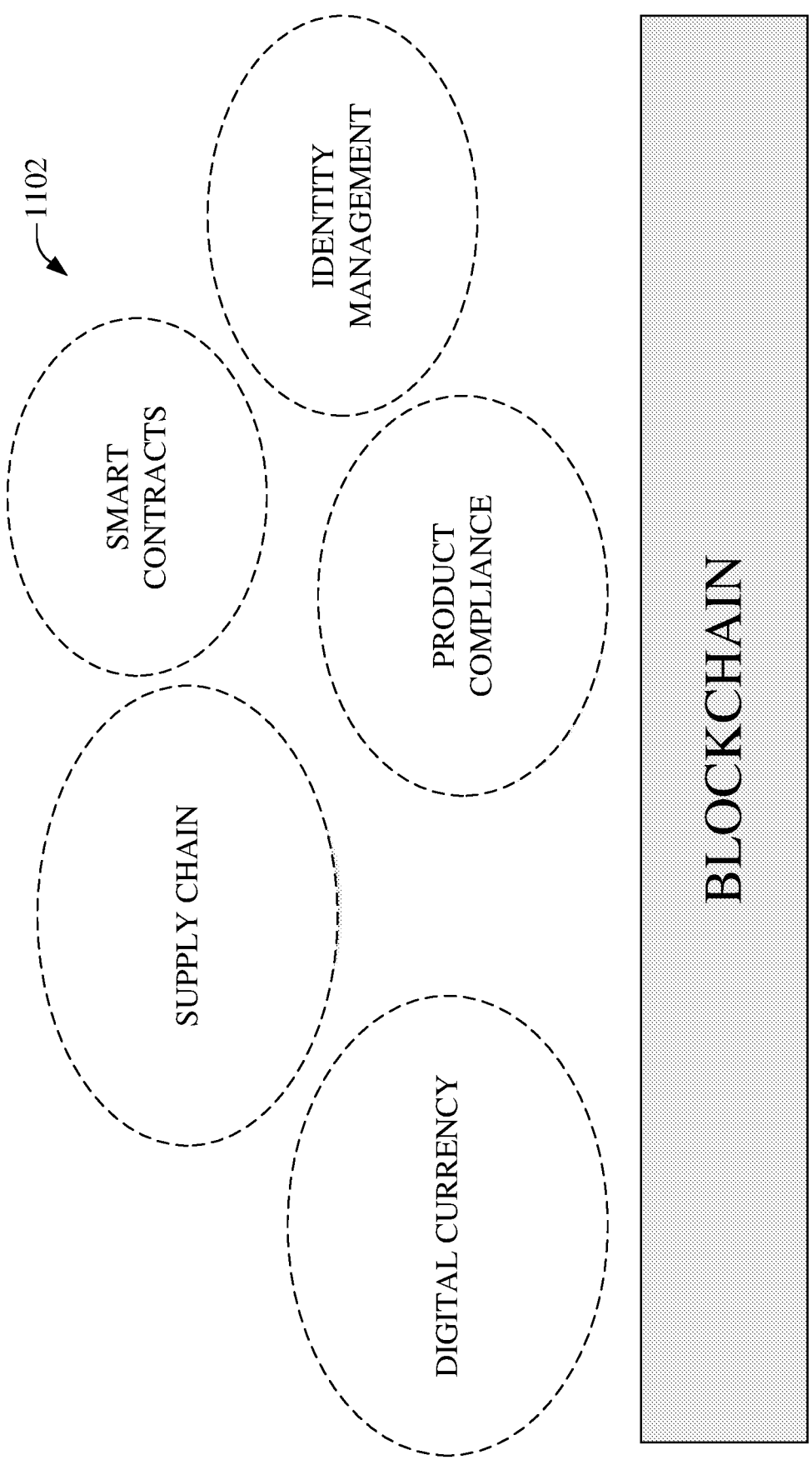
FIG. 11 is a generalized high-level diagram illustrating the relationship between blockchain technology and applications that can leverage blockchains in accordance with one or more embodiments described herein.

A general, high-level overview of blockchain technology is now provided as a background for the industrial-specific applications of blockchain technology discussed herein. FIG. 11 is a generalized high-level diagram illustrating the relationship between blockchain technology and applications 1102 that can leverage blockchains. In general, blockchain is a foundational technology upon which applications can be built to leverage the technology. Digital currency such as Bitcoin is an example application that uses a public blockchain to act as a distributed ledger in a peer-to-peer network. Blockchain technology is also used to implement smart contracts, which allow a set of contractual rules to be programmed and enforced by a network of peer-to-peer devices without requiring a third-party mediator or broker. As discussed herein, one or more embodiments of the present disclosure can include industrial devices and applications that leverage blockchain technology to perform supply chain tracking, verify product compliance, perform identity management, monitor, and record information relating to local manufacturing operations within a single facility (e.g., within the bounds of the plant's intranet), or other such industrial functions.

Figure 12:
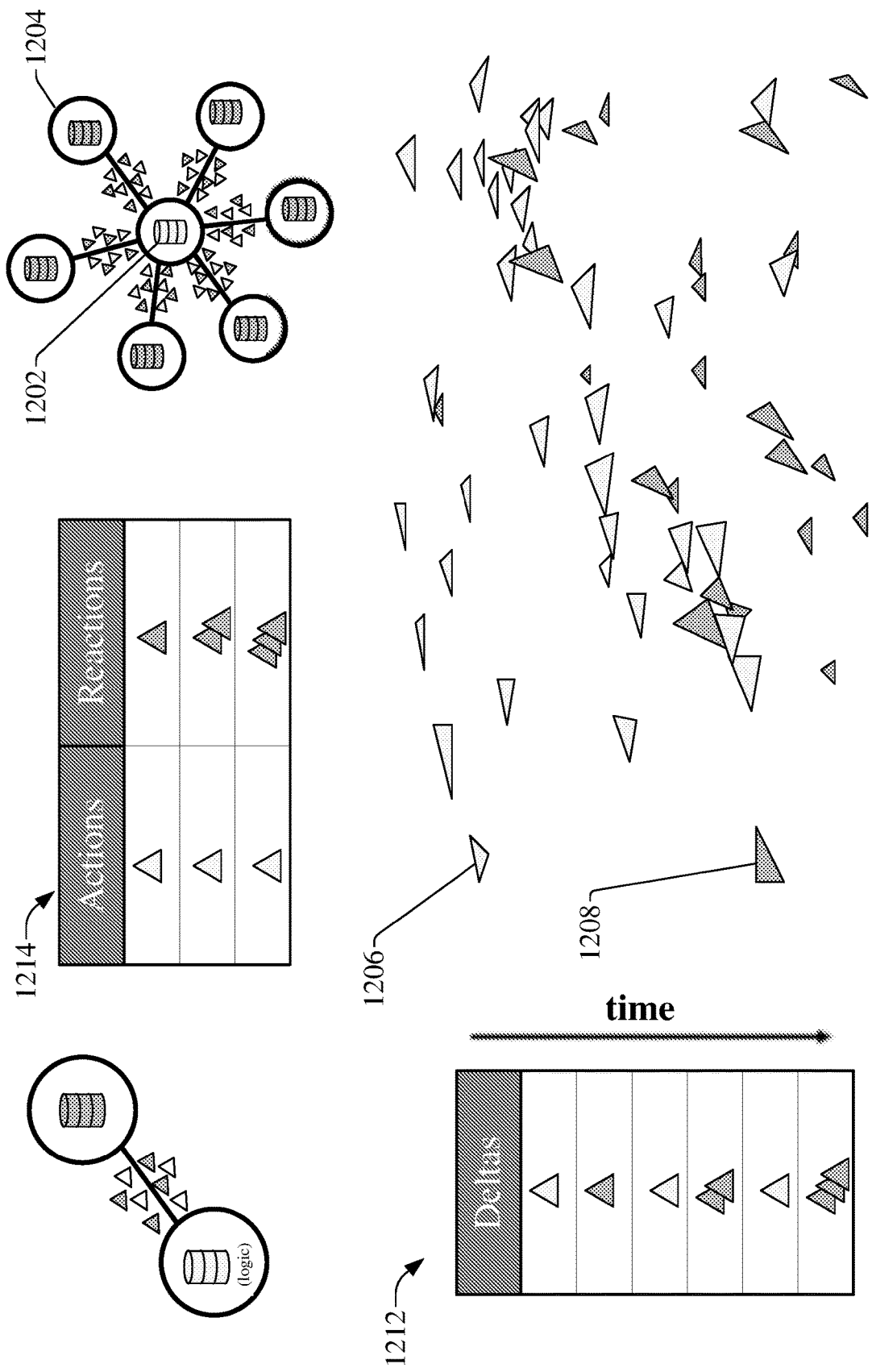
FIG. 12 is a graphic illustrating a centralized model for accessing and modifying data in accordance with one or more embodiments described herein.

Blockchain-based platforms can provide access to data from multiple parties in a decentralized manner, in contrast to platforms that share data using a centralized model. FIG. 12 is a graphic illustrating a centralized model for accessing and modifying data. According to this centralized model, there is a single "golden copy" 1202 of the data being viewed and acted upon by one or more entities 1204 (e.g., systems running applications that leverage the data represented by the golden copy 1202, client devices operated by respective users, etc.). Any of the entities 1204 can copy data maintained on the golden copy 1202 as a whole or in part. This golden copy 1202 of the data model is updated by commanding state changes to the model (an example technique for communicating state changes of objects between components is described in U.S. Pat. No. 9,864,365, which is incorporated herein by reference). These state change instructions are referred to herein as "actions" 1206. Copies and views of the golden copy 1202 remain synchronized by observing changes to the golden copy 1202 of the model. These observed changes are referred to herein as "reactions" 1208. Table 1214 represents a set of actions performed on the data and corresponding observed reactions accumulated as a result of the actions. The collection of actions 1206 and reactions 1208 can be viewed as a set of changes or deltas 1210 ordered by time, as represented by table 1212. This set of deltas 1210 can be "played back" by any number of entities to obtain the same consistent data model, with the golden copy 1202 being the model that is trusted by everyone.

Figure 13:
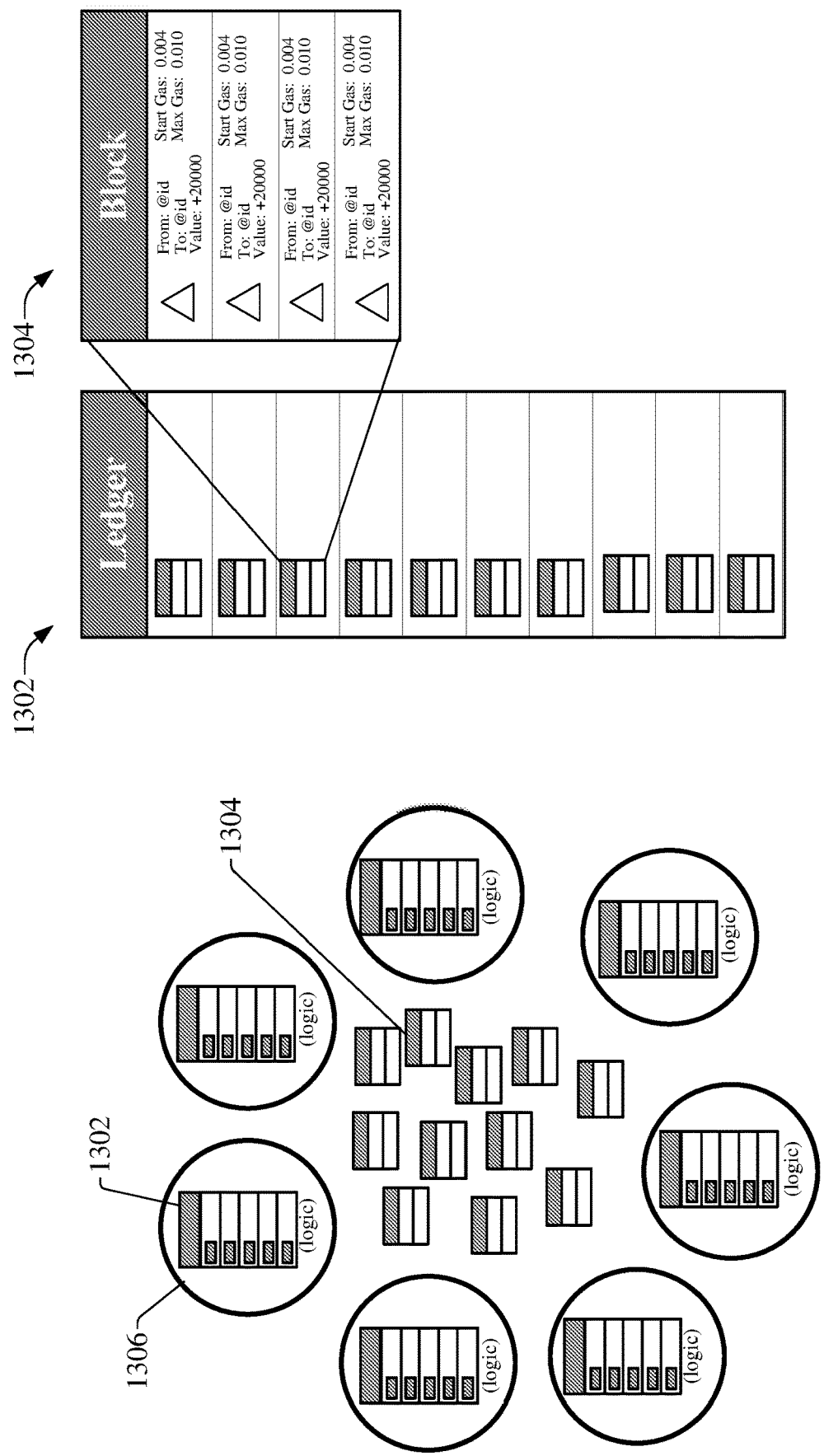
FIG. 13 is a graphic illustrating a decentralized model for accessing and modifying data in accordance with one or more embodiments described herein.

By contrast, blockchain-driven platforms decentralize the data model, eliminating the need to maintain a golden copy 1202 or distributing the multiple coordinated versions of the truth. FIG. 13 is a graphic illustrating a decentralized model. In a decentralized model, all entities 1306 that interact with the data have a copy of the data, and all entities work to keep the data model's transactions ordered and consistent. Blocks 1304 of changes to the data are recorded as a transaction. A distributed ledger 1302 of all these changes is maintained by all entities 1306 (or nodes or participants) that participate in the platform. If all entities 1306 apply the changes to their own copy of the data, then the copies remain consistent across the entities 1306 without the need for a single golden copy. Each entity maintains a copy of the ledger 1302, which represents a continuous chain of transaction blocks 1304, hence the term "blockchain." When a transaction is performed on the data by one of the entities 1306, all entities 1306 process the transaction and determine the validity of the transaction. If a consensus among the entities 1306 is reached regarding the transaction's validity, each entity updates its copy of the ledger 1302 accordingly.

Figure 14:
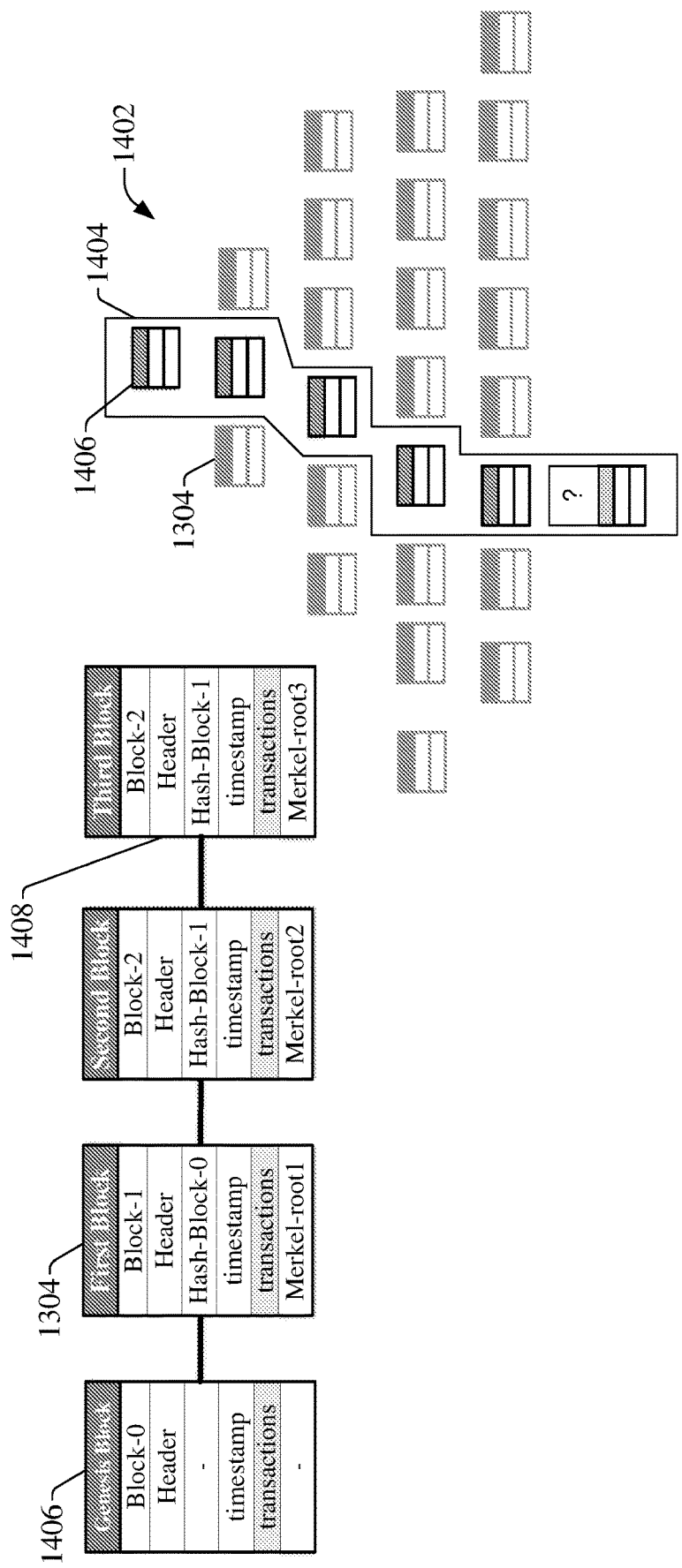
FIG. 14 is a graphic illustrating an example blockchain architecture in accordance with one or more embodiments described herein.

A blockchain consists of a data structure that orders blocks and links the blocks cryptographically, thereby acting as an immutable, verifiable, distributed ledger. Blockchains require no central authority; instead, trust is established and enforced cryptographically, with participating nodes (e.g., devices associated with entities 1306) acting as a consortium and voting on the validity of a block using a consensus mechanism to manage the distributed ledger. FIG. 14 is a graphic illustrating a blockchain architecture. Blockchains are a linked hierarchical list 1402 of transaction blocks 1304, where chains of related, linked transaction blocks 1304 within the hierarchy (e.g., chain 1404) stem from an initial genesis block 1406. Each block 1304 has a cryptographic identity, which is calculated by the header data 1408 in the block. Each block 1304 contains the hash of the previous block in the chain.

Figure 15:
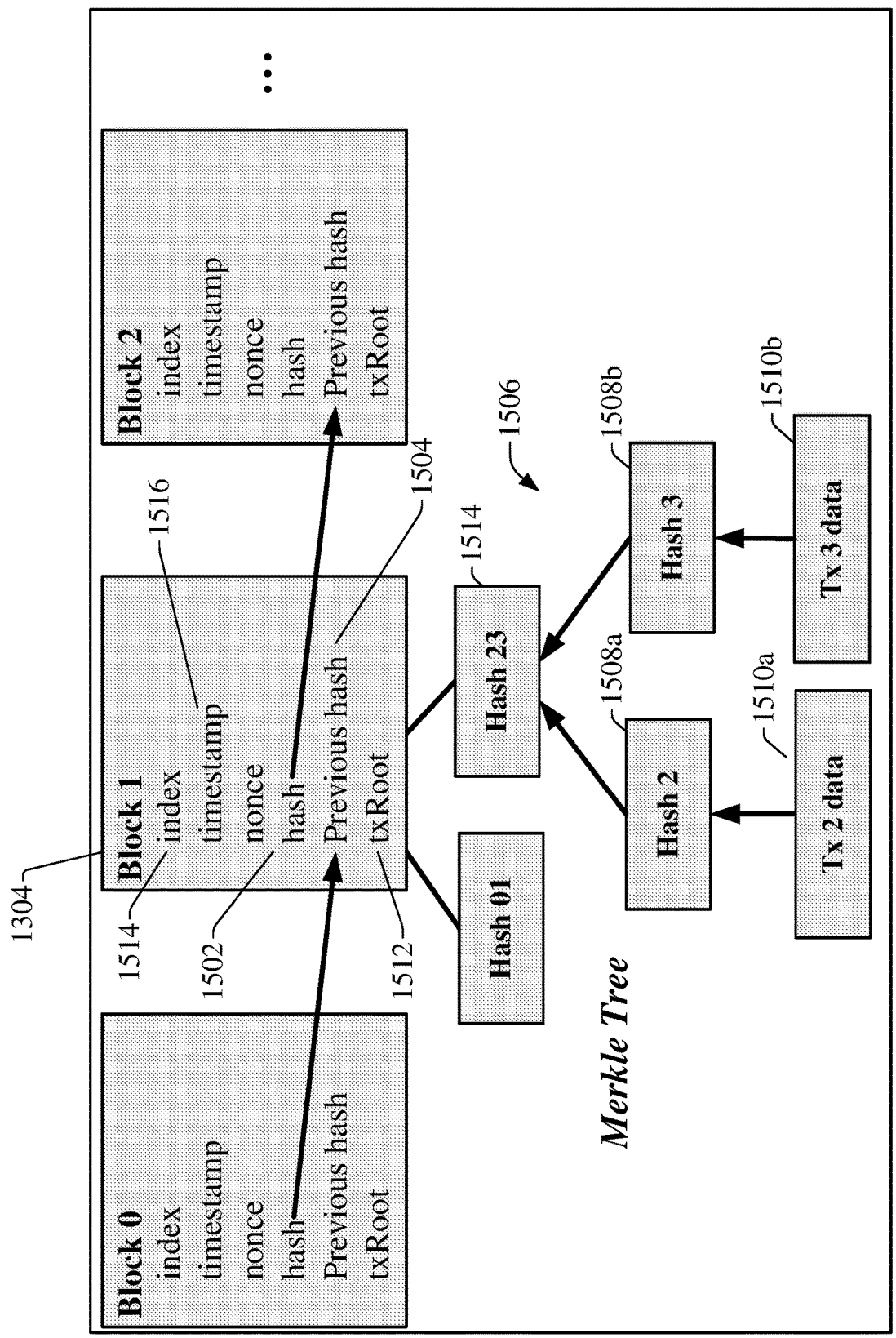
FIG. 15 is a diagram illustrating a general architecture of a blockchain in accordance with one or more embodiments described herein.

FIG. 15 is a diagram illustrating a general architecture of an example blockchain. Data 1510 associated with the block's transactions is hashed, and the collection of transaction data 1510 and their associated hashes 1508 create a Merkle tree 1506 of hashes 1508 (only two items of data 1510 are shown in FIG. 15 for clarity; however, a block 1304 can be associated with more than two transactions). In the illustrated example, each data item 1510a and 1510b is hashed to yield two corresponding hash values 1508a and 1508b. These two hashes 1508a and 1508b are combined into another hash value 1502 at the next higher level in the Merkle tree hierarchy. Hash values at a given level of the Merkle tree can be combined with other hash values on that level to yield hash values at the next higher level until the top of the Merkle tree hierarchy is reached.

The Merkle tree 1506 is stored separately from the block 1304, and only the root fingerprint 1512 (the top hash) is stored in the block 1304. Each block 1304 also contains a hash 1504 of the content of the immediately preceding block in the chain. For each block 1304, the Merkle tree of hashes 1508 and the hash 1504 of the previous block in the chain are used to create the hash 1502 for the block. The data 1510 is stored in the Merkle tree 1506 separately from the block 1304, with the root fingerprint 1512 being the only part of the Merkle tree 1506 stored in the block 1304. This nesting of cryptographic hash values yields a digital fingerprint that renders unauthorized tampering difficult. Compounded with the chaining of transaction blocks 1304, the blockchain becomes increasingly difficult to hack, producing a level of trustworthiness that increases over time. Improperly modifying a block 1304 would require tampering with the entire transaction history, rendering tampering nearly impossible. In this way, a verifiable, tamper-proof ledger of transactions can be efficiently maintained.

Figure 16:
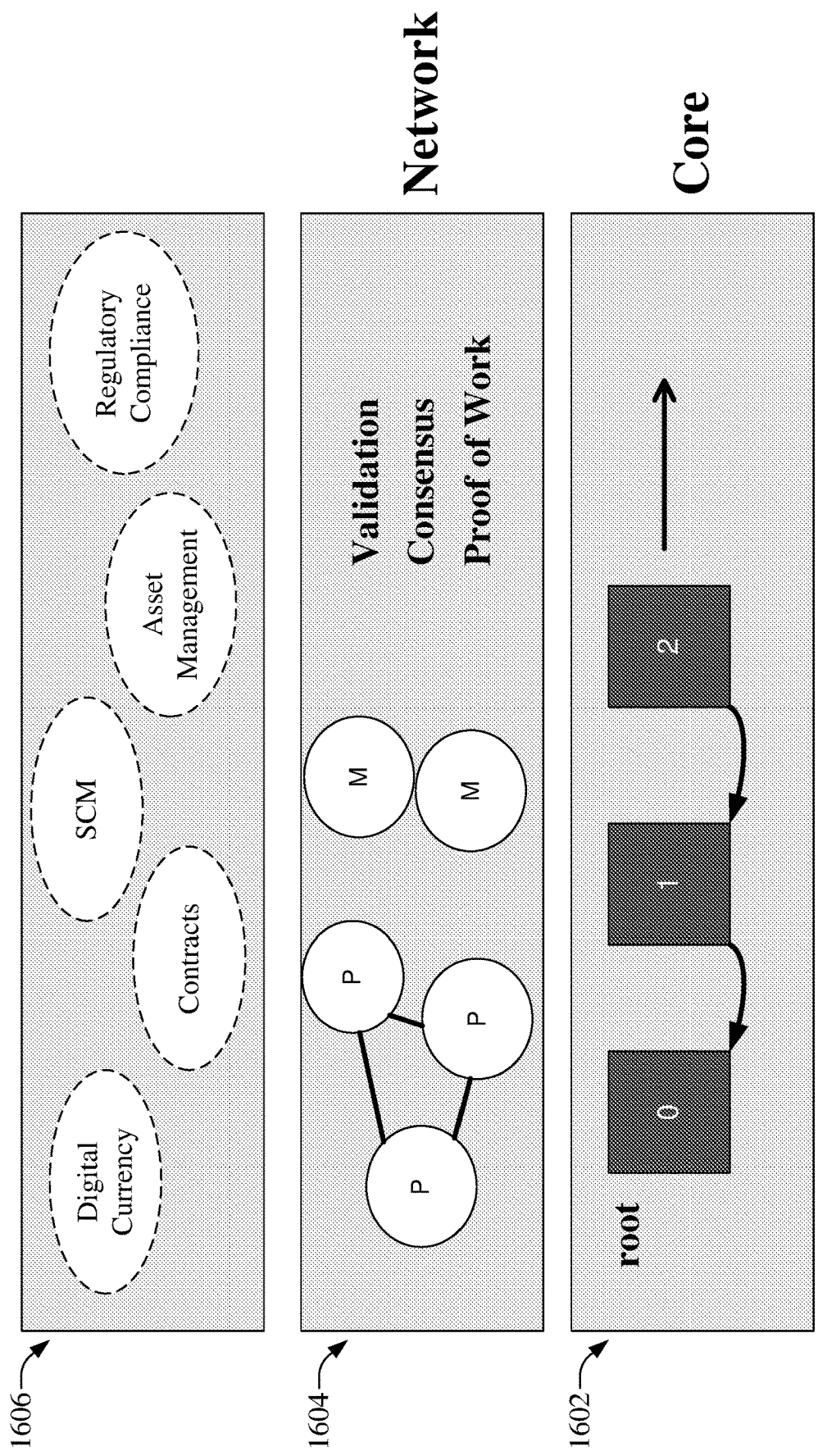
FIG. 16 is a diagram illustrating a generalized architecture of an example blockchain platform in accordance with one or more embodiments described herein.

FIG. 16 is a diagram illustrating a generalized architecture of a blockchain platform. The core blockchain functionality 1602 (the blockchain creation and management features described above) is implemented on a network 1604 of participating devices or nodes. The core blockchain ledger is distributed throughout the network, and is independently validated by network members. In a public model, the network 1604 is purely peer-to-peer with no central trust authority. Instead of a central trust authority, network peers are responsible for validation and decentralized consensus for acceptance of new transactions (that is, new blocks 1304 representing new transactions) into the blockchain. Public blockchains are secured by the amount of work required to create a new block 1304. This proof-of-work model can prevent network peers from improperly hijacking or tampering with the blockchain. Private blockchain models—including blockchain applications used within an industrial facility as will be described herein—can employ a central authority to manage the ledger, user identities, and creation of new blocks.

Applications 1606 that employ blockchains are constructed on top of the network layer, which exposes the core blockchain functions. Participants in the network 1604 (the peer devices) are uniquely identified with digital signatures granted by the network. Participant identities may be anonymous depending on the type of blockchain network model (e.g., public, or private). In all cases, transactions are published, visible, and verifiable on the blockchain.

Figure 17:
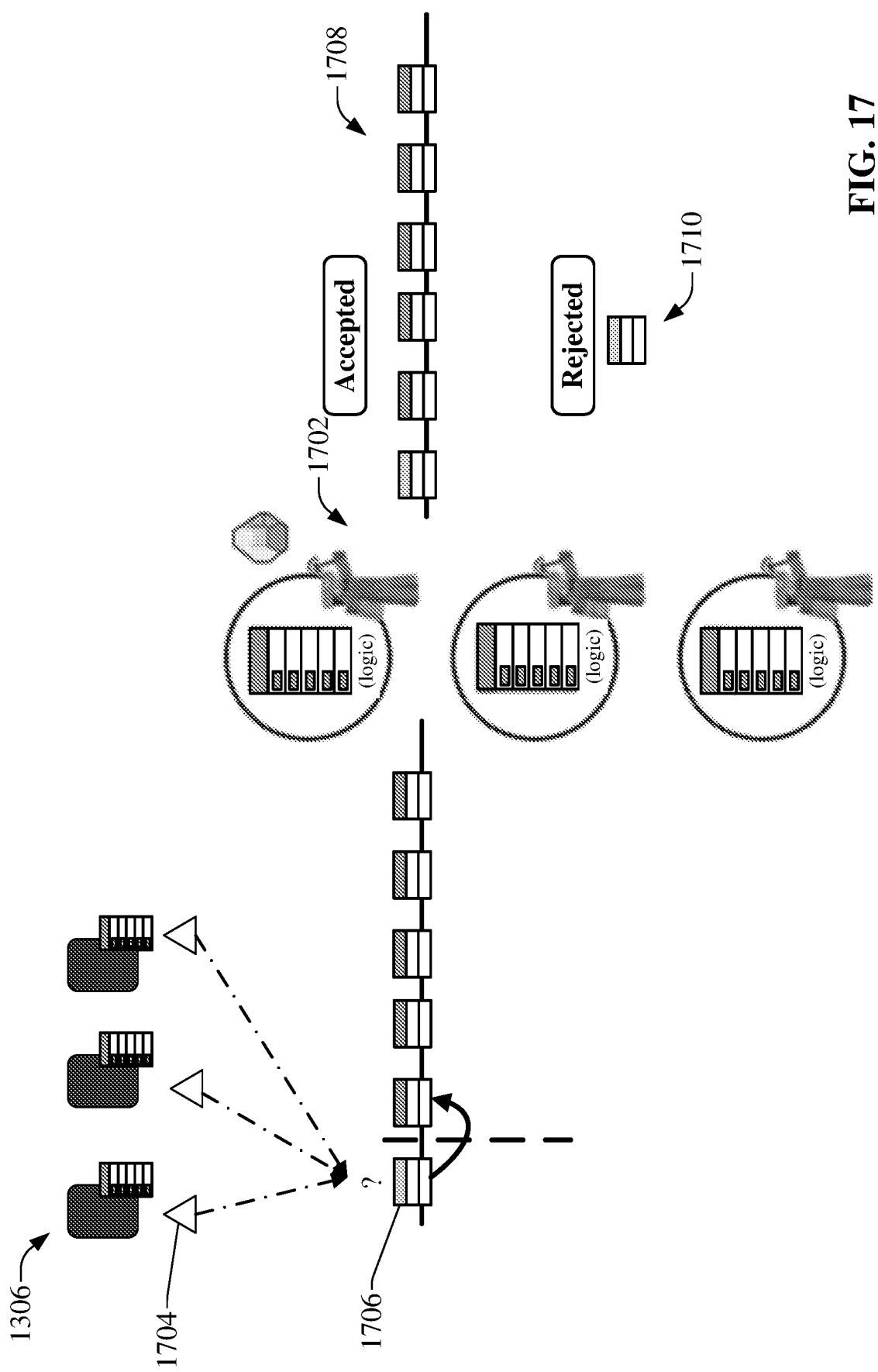
FIG. 17 is a generalized diagram illustrating creation of blocks and validation of blocks via consensus-based validation in accordance with one or more embodiments described herein.

FIG. 17 is a generalized diagram illustrating creation of blocks and validation of blocks via consensus-based validation. Single transactions 1704 performed by entities 1306 (participants in the blockchain network) are gathered into blocks 1706 by programmatic components executing on the entities 1306 referred to as "miners" 1702. Miners 1702 possess the entire Merkle tree for the gathered transactions and compete to build a valid block out of the Merkle tree. The first miner 1702 to create a block is rewarded. The block is then validated by the other entities 1306 based on the hashes. If valid, the block is added to the blockchain 1708.

Since these blocks 1706 are created and validated in parallel, different versions of the truth can be generated. In these cases, the peers (entities 1306) vote on which block should be used. Regardless of the final set of blocks, all choices are most likely valid. The participants in the blockchain network can validate transactions and reject invalid or nefarious transactions 1710 (e.g., spending the same money twice in the case of digital currency applications). The system is ultimately consistent and valid.

Figure 18:
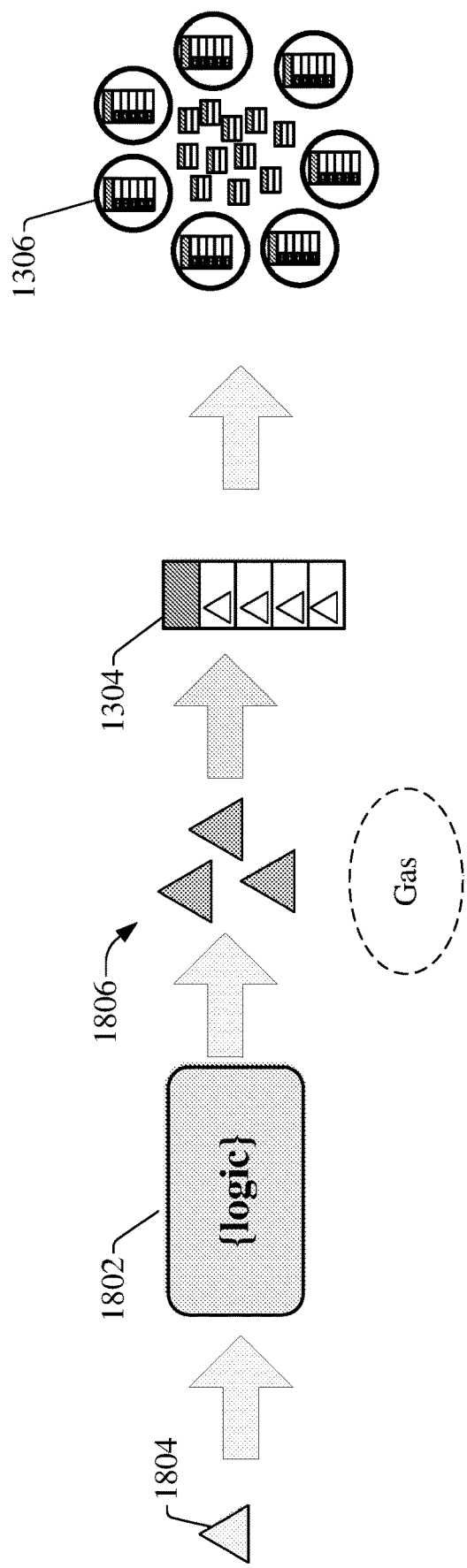
FIG. 18 is a generalized diagram illustrating implementation of smart contracts within a blockchain-driven system in accordance with one or more embodiments described herein.

Some blockchain platforms are also capable of implementing and enforcing smart contracts, which define rules or agreements between participants in the blockchain network. FIG. 18 is a generalized diagram illustrating implementation of smart contracts within a blockchain-driven system. In general, smart contracts are sets of logic 1802 that execute on the blockchain and generate new types of transactions in accordance with rules defined by the logic. The smart contract logic 1802 is executed by the participants of the blockchain. When a smart contract transaction 1804 is generated, the logic 1802 executes on the transaction 1804 and can create several new transactions 1806 designed to satisfy the contract. On the Ethereum platform, units of processing "fees" must be provided by an initiator of a smart contract transaction in order to execute the transaction. On the Ethereum platform, these fees are referred to as Ether or "gas." The amount of gas required to execute a transaction is generally proportional to the amount of work required to execute the transaction. The more complex the transaction, the more gas must be spent to execute the transaction. These processing "fees" can be used to prioritize transactions based on relative values of the transactions, and can also protect against Denial of Service attacks (e.g., attacks that place the contract's logic in an infinite loop). Work on selected transactions can be prioritized by assigning extra gas to the transactions.

Figure 19:
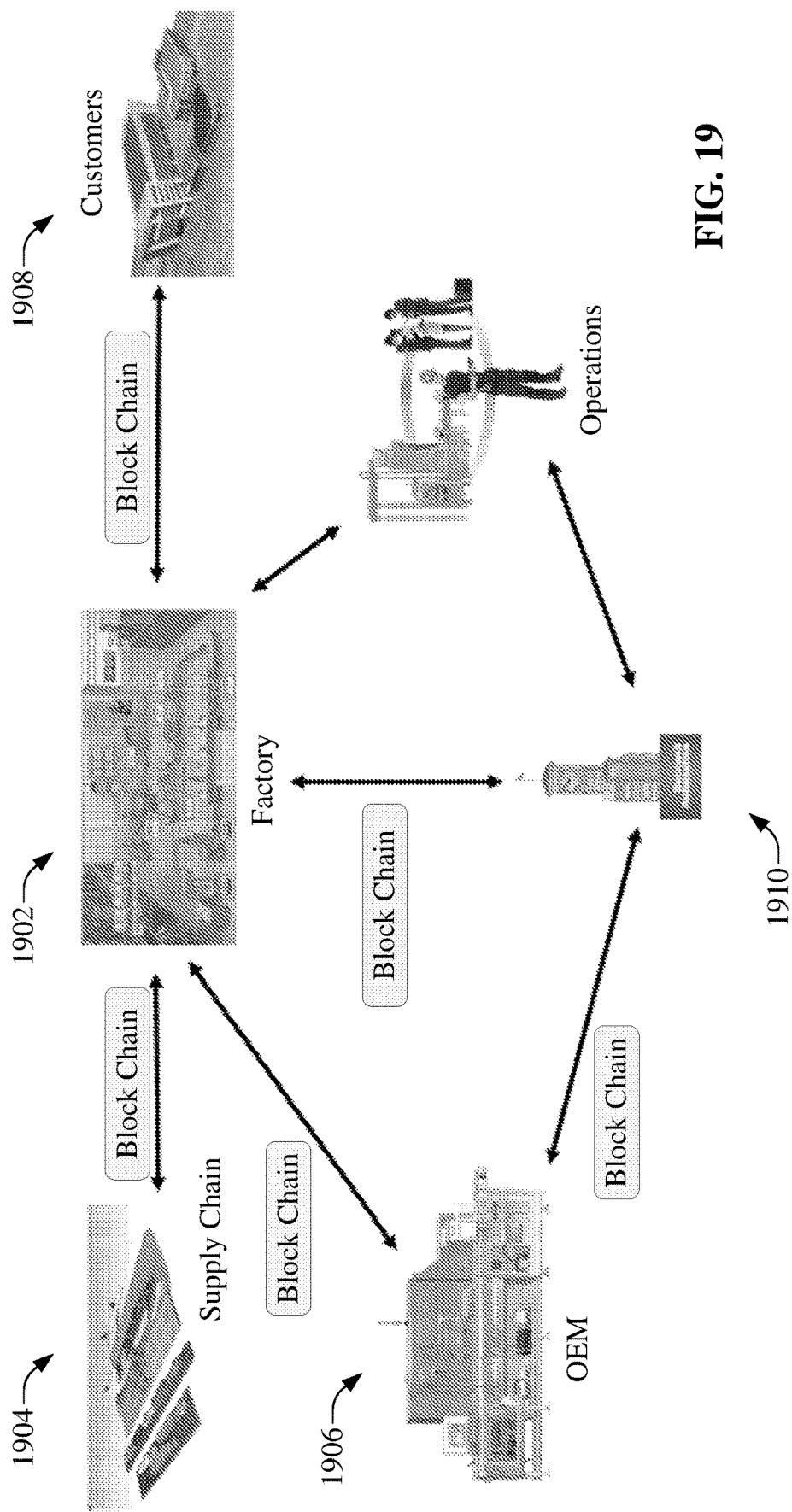
FIG. 19 is a high-level overview of entities and enterprises within an industrial supply and distribution chain within which industrial-specific blockchains can be utilized in accordance with one or more embodiments described herein.

Various embodiments described herein leverage aspects of blockchain platforms within the context of industrial facilities, industrial enterprises, and manufacturing and distribution supply chains. To this end, industrial devices such as industrial controllers, motor drives, data historians, telemetry devices, HMIs, and other such industrial devices are configured to support creation, validation, and sharing of blockchains. FIG. 19 is a high-level overview of entities and enterprises within an industrial supply and distribution chain within which industrial-specific blockchains can be utilized. In general, blockchain-enabled industrial devices can utilize blockchain technology in connection with such tasks as asset and product lifecycle management within a factory 1902; device, machine, line, or factory configuration integrity tracking; regulatory compliance verification; auditing of lock out/tag out safety procedures within the factory 1902; customer/partner entitlements management, management and tracking of supply chains 1904 across enterprise boundaries; inventory management across a supply chain; contracts management; tracking of manufactured products across enterprises of a supply chain or within a factory 1902; or other applications to be discussed herein.

The use of blockchains between industrial enterprises can also open the possibility of subscription-based serves between OEMs 1906 and owners of factories 1902, or between a manufacturing entity and its customers. Blockchains can also be used to track manufactured products to the end consumers 1908, and public blockchain data generated by a product's traversal through the manufacturing and supply chain can be accessed by consumers 1908 to obtain information about their purchased products. A device vendor 1910 can manufacture and provide blockchain-enabled industrial devices that are used within industrial factories 1902, OEM facilities 1906, and other enterprises to facilitate blockchain-driven industrial applications. The device vendor 1910 can also act as a trust authority for blockchain-driven systems that are implemented by the blockchain-enabled industrial devices. Robust identity management for organizations, people, and products that participate in an industrial blockchain system can ensure the trustworthiness of the participants and the blockchain data. Both public and private blockchain models can be implemented depending on the needs of the industrial application using the platform.

Figure 20:
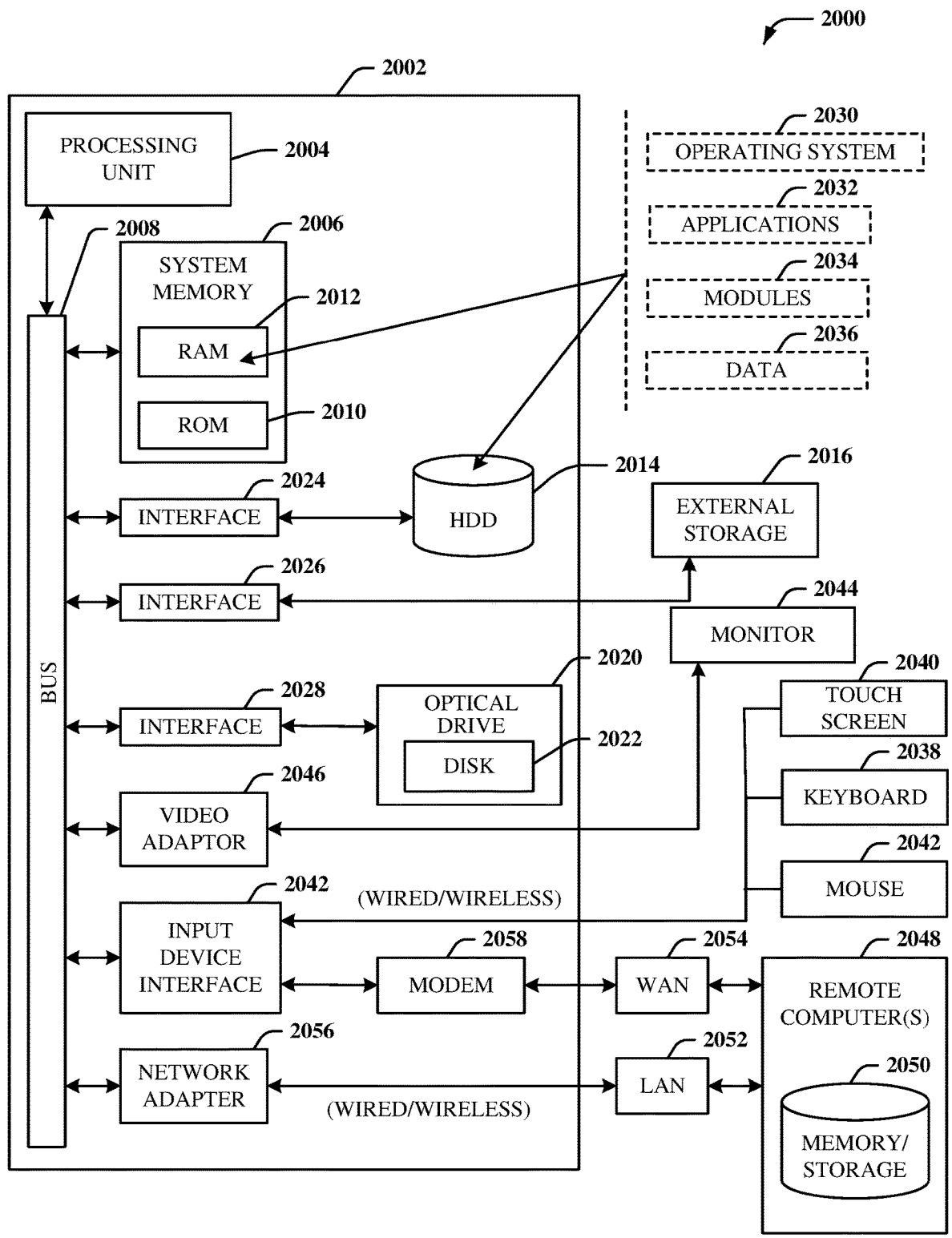
FIG. 20 is an example computing environment in accordance with one or more embodiments described herein.
Figure 21:
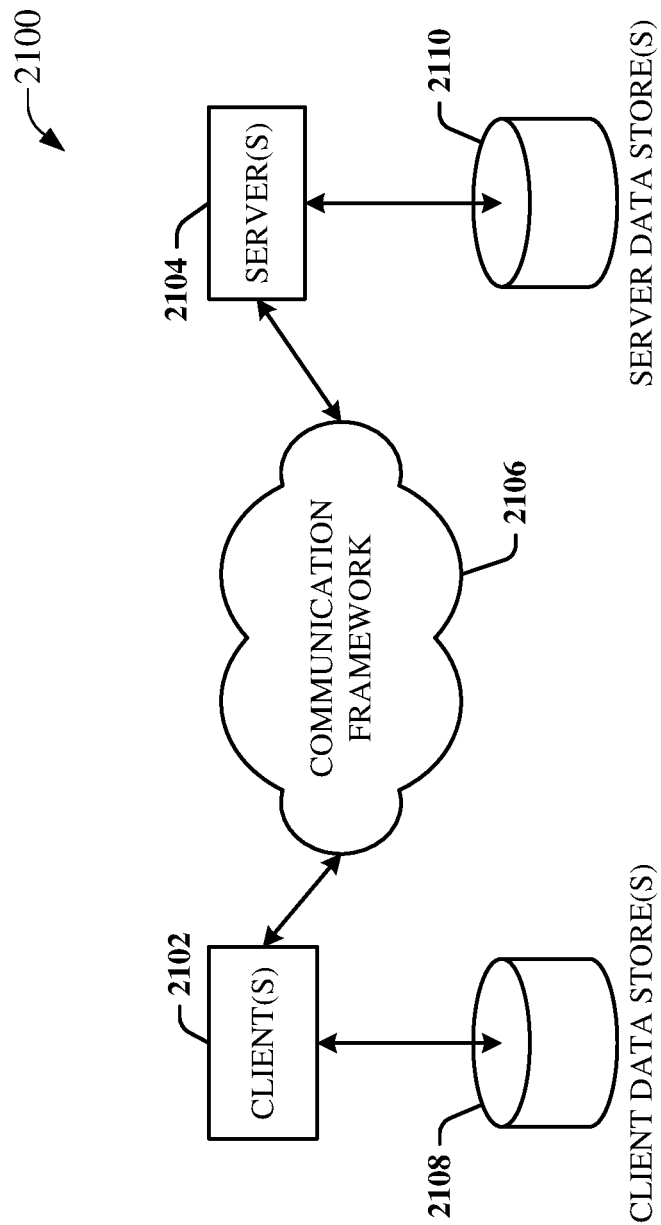
FIG. 21 is an example networking environment in accordance with one or more embodiments described herein.

In order to provide a context for the various aspects of the disclosed subject matter, FIGS. 20 and 21 as well as the following discussion are intended to provide a brief, general description of a suitable environment in which the various aspects of the disclosed subject matter can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 20, the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a nonvolatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance, with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a generation component that generates, at a first time, a first digital twin fingerprint for a digital twin of an industrial automation system and a first configuration fingerprint representative of a configuration of the industrial automation system;
a blockchain component that stores the first digital twin fingerprint and the first configuration fingerprint to an immutable blockchain ledger; and
a comparison component that:
determines an equivalency of the digital twin based on a comparison of the first digital twin fingerprint with a second digital twin fingerprint applicable to the industrial automation system generated at a second time, subsequent to the first time, or determines an equivalency of the configuration of the industrial automation system based on a comparison of the first configuration fingerprint with a second configuration fingerprint of the configuration of the industrial automation system generated at the second time, and
generates an output indicative of the equivalency of the digital twin or the equivalency of the configuration,
wherein the comparison component, in response to determining that the second digital twin fingerprint and the second configuration fingerprint match the first digital twin fingerprint and the first configuration fingerprint stored in the immutable blockchain ledger, generates the output to indicate that the digital twin used to generate the second digital twin fingerprint is valid for a current configuration of the industrial automation system, and
wherein the industrial automation system controls a machine in response to the determination of the equivalency of the digital twin or the equivalency of the configuration.

2. The system of claim 1, wherein the comparison component generates the output to indicate that the digital twin is not valid for the current configuration of the industrial automation system in response to a determination that the second configuration fingerprint does not match the first configuration fingerprint stored with the first digital twin fingerprint on the immutable blockchain ledger.

3. The system of claim 1, wherein the system is an industrial automation device of the industrial automation system.

4. The system of claim 1, wherein the digital twin comprises a mathematical representation of functionality of the industrial automation system employable to generate one or more simulated metrics for the industrial automation system.

5. The system of claim 4, wherein the first digital twin fingerprint comprises a unique identifier for the functionality of the industrial automation system.

6. The system of claim 1, wherein the configuration comprises a hardware or software makeup of the industrial automation system.

7. The system of claim 6, wherein the first configuration fingerprint comprises a unique identifier for the hardware or software makeup of the industrial automation system.

8. The system of claim 6, wherein the industrial automation system comprises an industrial controller, and wherein the hardware or software makeup of the industrial controller comprises an identity of a module of the industrial controller, an identity of a slot of the industrial controller in which the module is installed, or an electrical connection of the industrial controller.

9. The system of claim 1, wherein the generation component generates fingerprints using a defined hash or checksum algorithm.

10. The system of claim 1, wherein the immutable blockchain ledger is associated exclusively with the industrial automation system.

11. The system of claim 1, wherein the immutable blockchain ledger is associated with a plurality of industrial automation devices comprising the industrial automation system.

12. A method, comprising:
generating, by an industrial device comprising a processor, at a first time, at a first time, a first digital twin fingerprint for a digital twin of an industrial automation system and a first configuration fingerprint representative of a configuration of the industrial automation system;
storing, by the industrial device, the first digital twin fingerprint and the first configuration fingerprint to an immutable blockchain ledger;
determining, by the industrial device, an equivalency of the digital twin based on a comparison of the first digital twin fingerprint with a second digital twin fingerprint applicable to the industrial automation system generated at a second time, subsequent to the first time;
determining, by the industrial device, an equivalency of the configuration of the industrial automation system based on a comparison of the first configuration fingerprint with a second configuration fingerprint of the configuration of the industrial automation system generated at the second time;
generating, by the industrial device, an output indicative of the equivalency of the digital twin and the equivalency of the configuration; and
controlling, by the industrial device, an industrial machine in response to the determination of the equivalency of the digital twin and the equivalency of the configuration.

13. The method of claim 12, further comprising:
simulating, by the industrial device, data generation via the digital twin comprising generating first output data, using the digital twin and the configuration, based on input data;
simulating, by the industrial device, data generation via the industrial device comprising generating second output data, using the industrial automation system, based on the input data; and
comparing, by the industrial device, the first output data to the second output data.

14. The method of claim 13, further comprising:
obtaining, by the industrial device, the input data via a blockchain oracle communicatively coupled to the industrial device.

15. The method of claim 13, further comprising:
based on the comparing and in response to the first output data being determined not to match the second output data, flagging, by the industrial device, the industrial automation system as comprising an inequivalent configuration.

16. The method of claim 12, further comprising:
simulating, by the industrial device, data generation via the digital twin, wherein the simulating comprises generating output data using the digital twin and the configuration, based on input data, and wherein the simulating comprises a physics-based simulation; and
based on the physics-based simulation, determining, by the industrial device, whether the output data satisfies a defined threshold.

17. A non-transitory computer-readable medium having stored thereon instructions that, in response to execution, cause an industrial device comprising a processor to perform operations, the operations comprising:

generating, at a first time, at a first time, a first digital twin fingerprint for a digital twin of an industrial automation component and a first configuration fingerprint representative of a configuration of the industrial automation component;

storing the first digital twin fingerprint and the first configuration fingerprint to an immutable blockchain ledger;

determining an equivalency of the digital twin based on a comparison of the first digital twin fingerprint with a second digital twin fingerprint applicable to the industrial automation component generated at a second time, subsequent to the first time;

determining an equivalency of the configuration of the industrial automation component based on a comparison of the first configuration fingerprint with a second configuration fingerprint of the configuration of the industrial automation component generated at the second time;

generating an output indicative of the equivalency of the digital twin and the equivalency of the configuration; and controlling the industrial automation component in response to the determination of the equivalency of the digital twin and the equivalency of the configuration.

18. The non-transitory computer-readable medium of claim 17, wherein the digital twin comprises a reference digital twin applicable to a plurality of industrial automation components comprising the industrial automation component.

19. The non-transitory computer-readable medium of claim 17, wherein the digital twin comprises a first digital twin, wherein the industrial automation component comprises a first industrial automation component, and wherein the operations further comprise:

comparing the first digital twin fingerprint to a third digital twin fingerprint of a second digital twin of a second industrial automation component; and based on the comparing and in response to the first digital twin fingerprint being determined not to match the third digital twin fingerprint, flagging the first industrial automation component and the second industrial automation component as non-matching industrial automation components.

20. The non-transitory computer-readable medium of claim 17, wherein the operations further comprise:

in response to determining that the second digital twin fingerprint and the second configuration fingerprint match the first digital twin fingerprint and the first configuration fingerprint stored in the immutable blockchain ledger, generating the output to indicate that the digital twin used to generate the second digital twin fingerprint is valid for a current configuration of the industrial automation component.

* * * * *